(12) United States Patent
Bar-Zeev et al.

(10) Patent No.: US 9,710,973 B2
(45) Date of Patent: *Jul. 18, 2017

(54) LOW-LATENCY FUSING OF VIRTUAL AND REAL CONTENT

(71) Applicant: Microsoft Technology Licensing, LLC, Redmond, WA (US)

(72) Inventors: Avi Bar-Zeev, Redmond, WA (US); J. Andrew Goossen, Issaquah, WA (US); John Tardif, Sammamish, WA (US); Mark S. Grossman, Palo Alto, CA (US); Harjit Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,589

(22) Filed: May 23, 2016

(65) Prior Publication Data

US 2016/0267717 A1    Sep. 15, 2016

Related U.S. Application Data

(63) Continuation of application No. 12/912,937, filed on Oct. 27, 2010, now Pat. No. 9,348,141.

(51) Int. Cl.
*G06T 19/00*    (2011.01)
*G06T 15/40*    (2011.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC .......... G06T 19/00; G06T 15/40; G06T 15/20; G06T 19/006; G06T 2207/10016; G06T 3/4038; G06Q 10/10; A63F 13/12
See application file for complete search history.

(56) References Cited

U.S. PATENT DOCUMENTS 6,330,281 B1    12/2001  Mann et al.
6,525,731 B1     2/2003  Suits et al.
(Continued)

FOREIGN PATENT DOCUMENTS

CN    1452071    10/2003
CN    1627237     6/2005
(Continued)

OTHER PUBLICATIONS

Response to Office Action filed May 18, 2016, with partial English translation, in Chinese Patent Application No. 201110354995.8, 15 pages.
(Continued)

*Primary Examiner* — Ke Xiao
*Assistant Examiner* — Andrew Shin
(74) *Attorney, Agent, or Firm* — Vierra Magen Marcus LLP

(57) ABSTRACT

A system that includes a head mounted display device and a processing unit connected to the head mounted display device is used to fuse virtual content into real content. In one embodiment, the processing unit is in communication with a hub computing device. The processing unit and hub may collaboratively determine a map of the mixed reality environment. Further, state data may be extrapolated to predict a field of view for a user in the future at a time when the mixed reality is to be displayed to the user. This extrapolation can remove latency from the system.

20 Claims, 15 Drawing Sheets

(51) Int. Cl.
| | |
|---|---|
| *G06T 15/20* | (2011.01) |
| *G06F 3/01* | (2006.01) |
| *G02B 27/01* | (2006.01) |
| *G06F 3/03* | (2006.01) |
| *G06T 1/20* | (2006.01) |
| *G09G 3/00* | (2006.01) |
| *G06T 7/70* | (2017.01) |
| *G02B 27/00* | (2006.01) |

(52) U.S. Cl.
CPC .............. *G06F 3/012* (2013.01); *G06F 3/013* (2013.01); *G06F 3/0304* (2013.01); *G06T 1/20* (2013.01); *G06T 7/70* (2017.01); *G06T 15/20* (2013.01); *G09G 3/007* (2013.01); *G02B 27/0093* (2013.01); *G02B 2027/014* (2013.01); *G02B 2027/0134* (2013.01); *G02B 2027/0138* (2013.01); *G06T 2219/024* (2013.01); *G09G 2340/125* (2013.01); *G09G 2370/02* (2013.01)

(56) References Cited

U.S. PATENT DOCUMENTS

| | | | |
|---|---|---|---|
| 6,795,090 | B2 | 9/2004 | Cahill et al. |
| 6,956,566 | B2 | 10/2005 | Gelb |
| 2003/0067536 | A1 | 4/2003 | Boulanger et al. |
| 2005/0024388 | A1 | 2/2005 | Takemoto |
| 2005/0083248 | A1 | 4/2005 | Biocca et al. |
| 2008/0284864 | A1 | 11/2008 | Kotake et al. |
| 2010/0091096 | A1 | 4/2010 | Oikawa et al. |
| 2011/0066262 | A1* | 3/2011 | Kelly ................ G05B 23/0267 700/90 |
| 2011/0116684 | A1 | 5/2011 | Coffman et al. |
| 2012/0075167 | A1 | 3/2012 | Lahcanski et al. |

FOREIGN PATENT DOCUMENTS

| | | |
|---|---|---|
| CN | 101510189 | 8/2009 |
| CN | 101673161 A | 3/2010 |

OTHER PUBLICATIONS

Notice of Grant dated Jun. 7, 2016 in Chinese Patent Application No. 201110354995.8, 4 pages.
"Third Office Action and Search Report Issued in Chinese Patent Application No. 201110354995.8," and partial English translation, mailed date: May 18, 2015, 14 pages.
Notice of Allowance and Fee(s) Due dated May 7, 2015 in U.S. Appl. No. 13/443,368.
Response to Office Action filed Aug. 3, 2015, with partial English translation, in Chinese Patent Application No. 201110354995.8.
"Fourth Office Action in Chinese Patent Application No. 201110354995.8," mailed date: Nov. 27, 2015, 10 pages.
"Second Office Action issued in Chinese Patent Application No. 201110354995.8," and partial English translation, mailed date: Nov. 15, 2014, 9 pages.
Office Action dated Nov. 20, 2014 in U.S. Appl. No. 13/443,368, 55 pages.
Response to Office Action filed Feb. 4, 2015 in U.S. Appl. No. 13/443,368, 14 pages.
Response to Office Action, and partial English translation, filed Jan. 23, 2015 in Chinese Patent Application No. 201110354995.8, 8 pages.
English language Abstract for CN1452071 published Oct. 29, 2003.
English language Abstract for CN1627237 published Jun. 15, 2005.
English language Abstract for CN101510189 published Aug. 19, 2009.
First Office Action dated Mar. 13, 2014, and partial English translation thereof, in Chinese Patent Application No. 201110354995.8.
Response to Office Action in Chinese Patent Application No. 201110354995.8, with English Summary of the Response and English translation of the pending claims.
Office Action dated Jul. 24, 2014 in U.S. Appl. No. 13/443,368.
Response to Office Action filed Jul. 24, 2014 in U.S. Appl. No. 13/443,368.
Giesen, Fabian, "Efficient Compression and Rendering in a Client-Server setting," Thesis submitted to the Math and Science faculty of Rheinischen Friedrich-Wilhelms-Universitat in Bonn, Germany, May 2008, pp. 1-68.
Koller et al., "Protected Interactive 3D Graphics via Remote Rendering," International Conference on Computer Graphics and Interactive Techniques, Aug. 8-12, 2004, pp. 1-9, ACM, New York, NY.
Pasman W., and F.W. Jansen, "Comparing Simplification and Image-Based Techniques for 3D Client-Server Rendering Systems," Institute of Electrical and Electronics Engineers—Translations on Visualization and Computer Graphics, Apr. 2003, pp. 226-240, vol. 9, Issue 2, IEEE Educational Activities Department, Piscataway, N.J.
Quax, et al., "On the Applicability of Remote Rendering of Networked Virtual Environments on Mobile Devices," Proceedings of the 2006 International Conference on Systems and Networks Communication, Oct. 29-Nov. 3, 2006, pp. 1-6, IEEE, Washington, DC.
Smit, et al., "An Image-Warping Architecture for VR: Low Latency versus Image Quality," The 2009 Institute of Electrical and Electronics Engineers Virtual Reality Conference, Mar. 14-18, 2009, pp. 27-34, IEEE, New York, NY.
Notice of Allowance and Fees Due dated Feb. 1, 2016 in U.S. Appl. No. 12/912,937.
Non-Final Rejection mailed Apr. 10, 2015 in U.S. Appl. No. 12/912,937.
Non-Final Rejection mailed Jun. 3, 2014 in U.S. Appl. No. 12/912,937.
Final Rejection mailed Dec. 17, 2014 in U.S. Appl. No. 12/912,937.
Amendment dated Oct. 23, 2015 in U.S. Appl. No. 12/912,937.
Amendment dated Mar. 30, 2015 in U.S. Appl. No. 12/912,937.
Amendment dated Sep. 3, 2014 in U.S. Appl. No. 12/912,937.
Preliminary Amendment dated Aug. 26, 2011 in U.S. Appl. No. 12/912,937.
Office Action dated Jul. 26, 2016, with partial English translation, in Chinese Patent Application No. 201310122256.5, 7 pages.
Response to Office Action filed Jul. 26, 2016, with partial English translation, in Chinese Patent Application No. 201310122256.5, 7 pages.

\* cited by examiner (Step 608)

(Step 614)

Fig. 12
(Step 618)
Fig. 13
(Step 632)
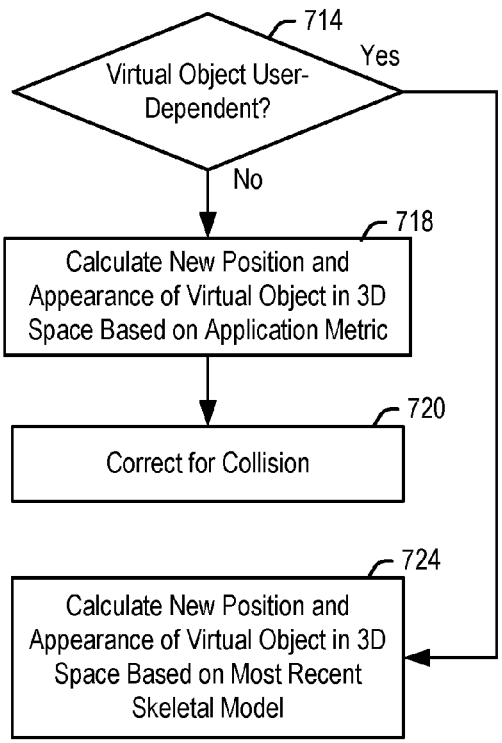
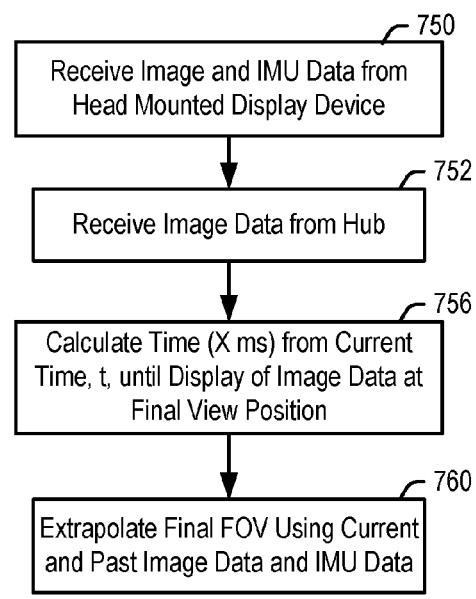

(Step 760)

(Step 640)

(Step 646)

(Step 812)

LOW-LATENCY FUSING OF VIRTUAL AND REAL CONTENT

CLAIM OF PRIORITY

The present application is a continuation of U.S. patent application Ser. No. 12/912,937, filed on Oct. 27, 2010, which application is incorporated by reference herein in its entirety.

BACKGROUND

Mixed reality is a technology that allows virtual imagery to be mixed with a real world physical environment. For example, a mixed reality system can be used to insert an image of a dinosaur into a user's view of a room so that the user sees a dinosaur walking in the room.

A significant drawback of conventional mixed reality systems is latency. When a user turns his head, the user's view of the real world changes pretty much instantaneously. However, in conventional mixed reality systems, it takes time for the sensors to sense the new image data and render the graphics image for display to the head gear worn by the user. While recent advances have minimized this latency, it is still anywhere from one to a few frames. This visual mismatch between the actual and virtual views can cause discomfort and disorientation for users. Conventional mixed reality systems have also relied on powerful but large processing systems to perform the bulk of the processing including constructing a map of the real world environment and rendering of the graphics image.

SUMMARY

The technology described herein provides a system for fusing virtual content with real content to provide a mixed reality experience for one or more users. The system includes mobile display devices wirelessly communicating with a powerful hub computing system. Each mobile display device may include a mobile processing unit coupled to a head mounted display device (or other suitable apparatus) having a display element. Each user wears a head mounted display device which allows the user to look through the display element at the room. The display device allows actual direct viewing of the room and the real world objects in the room through the display element. The display element also provides the ability to project virtual images into the field of view of the user such that the virtual images appear to be in the room. The system automatically tracks where the user is looking so that the system can determine where to insert the virtual image in the field of view of the user. Once the system knows where to project the virtual image, the image is projected using the display element.

In embodiments, the hub computing system and one or more of the processing units may cooperate to build a model of the environment including the x, y, z Cartesian positions of all users, real world objects and virtual three-dimensional object in the room or other environment. The positions of each head mounted display device worn by the users in the environment may be calibrated to the model of the environment and to each other. This allows the system to determine each user's line of sight and field of view of the environment. Thus, a virtual image may be displayed to each user, but the system determines the display of the virtual image from each user's perspective, adjusting the virtual image for parallax and any occlusions from or by other objects in the environment. The model of the environment, referred to herein as a scene map, as well as all tracking of the user's field of view and objects in the environment may be generated by the hub and computing device and the one or more processing elements working in tandem. In further embodiments, the one or more processing units may perform all system operations and the hub computing system may be omitted.

It takes time to generate and update the positions of all objects in an environment and it takes time to render the virtual objects from the perspective of each user. These operations thus introduce inherent latency in the system. However, over small time periods such as a few frames of data, movements tend to be generally smooth and steady. Therefore in accordance with the present technology, data from current and past time periods may be examined so as to extrapolate the positions of objects, and each user's view of those objects, into the future. Using this future prediction of the final scene map and user field of view of the scene map, virtual images of the scene may be displayed to each user without any latency. The prediction of the final scene map and user field of view may be updated throughout a frame to narrow the possible solutions until it is time to send a rendered image to the head mounted display device of each user to display the virtual elements of the mixed reality experience.

In embodiments, the present technology relates to a system for presenting a mixed reality experience to one or more users, the system comprising: one or more display devices for the one or more users, each display device including a first set of sensors for sensing data relating to a position of the display device and a display unit for displaying a virtual image to the user of the display device; one or more processing units, each associated with a display device of the one or more display devices and each receiving sensor data from the associated display device; and a hub computing system operatively coupled to each of the one or more processing units, the hub computing device including a second set of sensors, the hub computing system and the one or more processing units collaboratively determining a three-dimensional map of the environment in which the system is used, based on data from the first and second sets of sensors.

In a further example, the present technology relates to a system for presenting a mixed reality experience to one or more users, the system comprising: a first head mounted display device including: a camera for obtaining image data of an environment in which the first head mounted display device is used, inertial sensors for providing inertial measurements of the first head mounted display, and a display device for displaying virtual images to a user of the first head mounted display device, and a first processing unit, associated with the first head mounted display, for determining a three-dimensional map of the environment in which the first head mounted display device is used and a field of view from which the first head mounted display device views the three-dimensional map.

In a further example, the present technology relates to a method of presenting a mixed reality experience to one or more users, the system comprising: (a) determining state information for at least two periods of time, the state information relating to a field of view of a user of an environment, the environment including a mixed reality of one or more real world objects and one or more virtual objects; (b) extrapolating the state information relating to the field of view of the user of the environment for a third period of time, the third period of time being a time in the future when the one or more virtual images of the mixed reality are to be displayed to the user; and (c) displaying at least one virtual image of the one or more virtual images to the user at the third period of time based on the state information relating to the field of view of the user extrapolated in said step (b).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 10-16A are more detailed flowcharts of examples of various steps shown in the flowchart of FIG. 9.

DETAILED DESCRIPTION

A system is disclosed herein that can fuse virtual objects with real objects. In one embodiment, the system includes a head mounted display device and a processing unit in communication with the head mounted display device worn by each of one or more users. The head mounted display device includes a display that allows a direct view of real world objects through the display. The system can project virtual images on the display that are viewable by the person wearing the head mounted display device while that person is also viewing real world objects through the display. Multiple users may further see the same virtual object from their different perspectives, as if each is looking at a real world object from their different positions. Various sensors are used to detect position and orientation of the one or more users in order to determine where to project the virtual images.

One or more of the sensors are used to scan the neighboring environment and build a model of the scanned environment. Using the model, a virtual image is added to a view of the model at a location that is in reference to a real world object that is part of the model. The system automatically tracks where the one or more users are looking so that the system can figure out the users' field of view through the display of the head mounted display device. Each of the users can be tracked using any of various sensors including depth sensors, image sensors, inertial sensors, eye position sensors, etc.

Using current and past data relating to a model of the environment (including users, real world objects and virtual objects) and a user's field of view of that environment, the system extrapolates into the future to predict the model of the environment and a user's field of view of that environment at a time when the image of the environment is to be displayed to the user. Using this prediction, the virtual images may then be rendered without latency. The image is rendered by sizing and orienting the virtual image and rendering that sized/oriented image on the display of the head mounted display device for each user that has a view of the virtual image. In embodiments, the virtual image or the view of the real world objects can be changed to account for occlusions.

Figure 1:
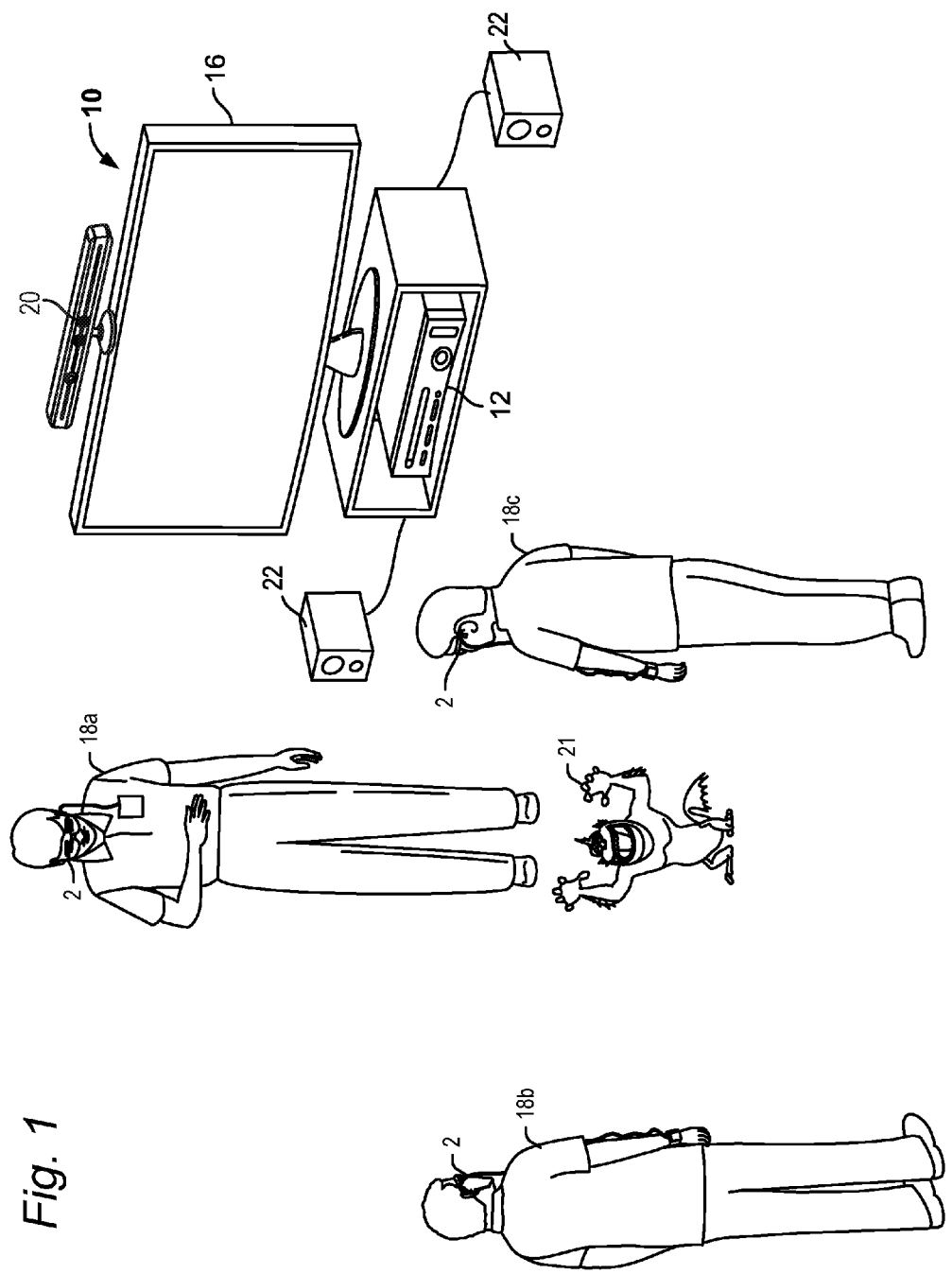
FIG. 1 is an illustration of example components of one embodiment of a system for presenting a mixed reality environment to one or more users.
Figure 2:
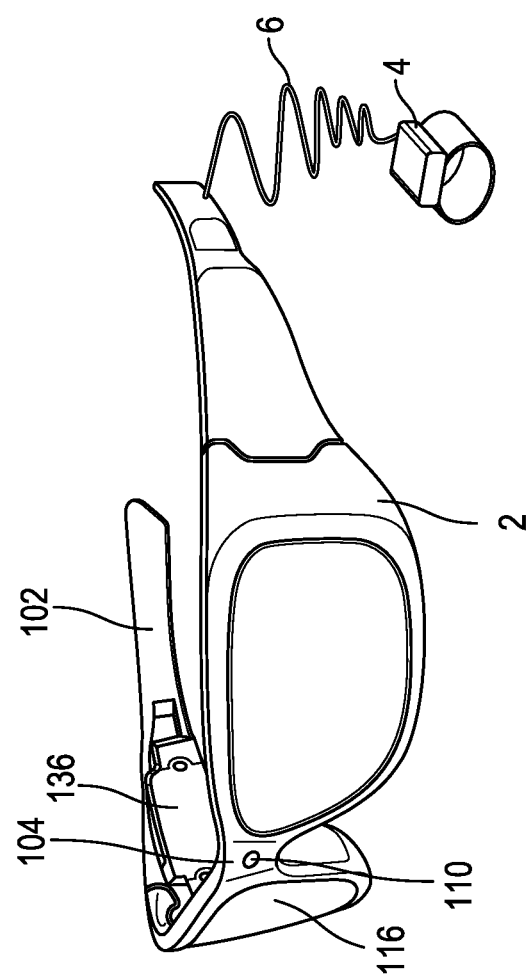
FIG. 2 is a perspective view of one embodiment of a head mounted display unit.
Figure 3:
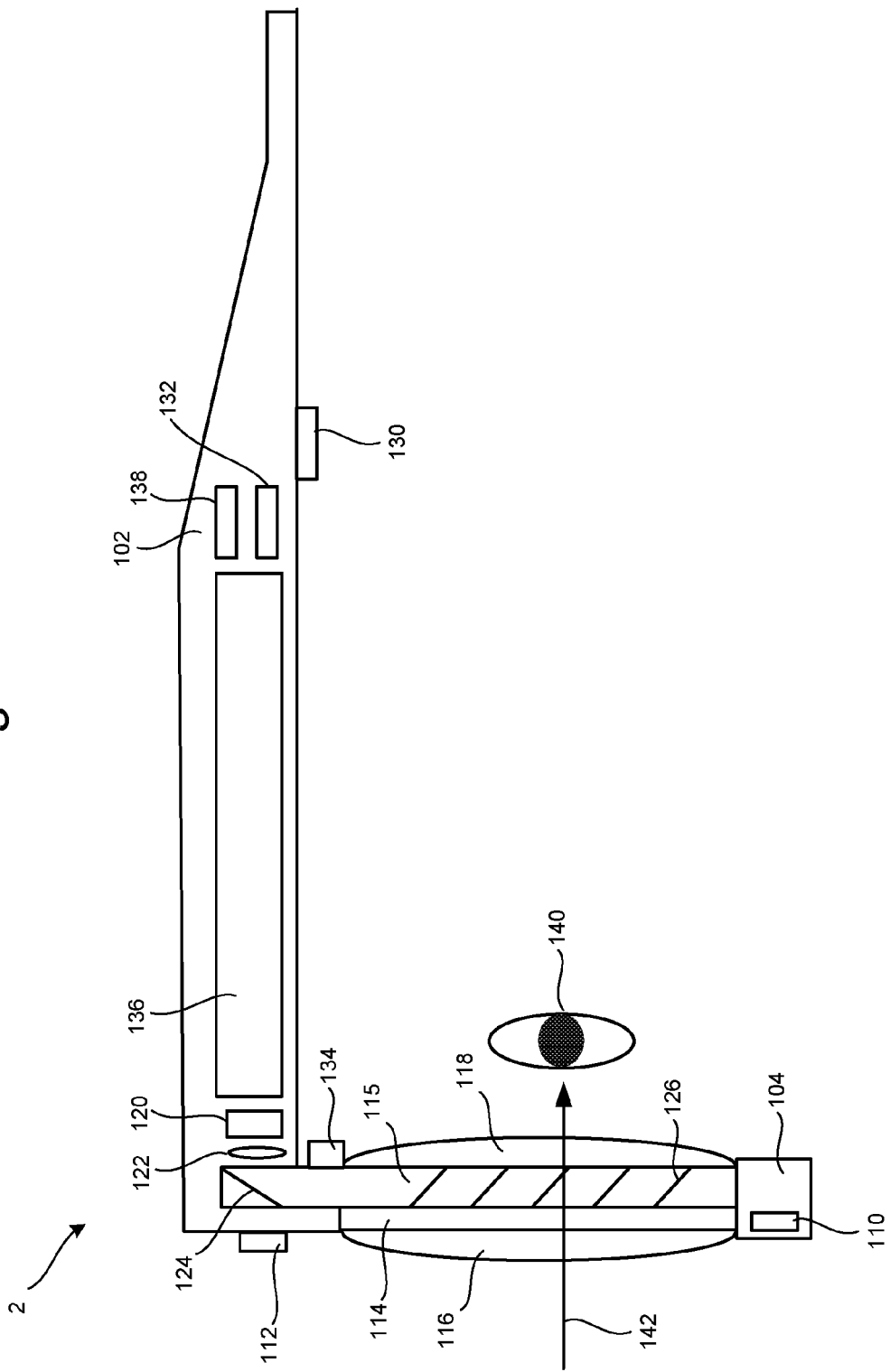
FIG. 3 is a side view of a portion of one embodiment of a head mounted display unit.

FIG. 1 illustrates a system 10 for providing a mixed reality experience by fusing virtual content into real content. FIG. 1 shows a number of users 18a, 18b and 18c each wearing a head mounted display device 2. As seen in FIGS. 2 and 3, each head mounted display device 2 is in communication with its own processing unit 4 via wire 6. In other embodiments, head mounted display device 2 communicates with processing unit 4 via wireless communication. Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

In one embodiment, processing unit 4 is a small, portable device for example worn on the user's wrist or stored within a user's pocket. The processing unit may for example be the size and form factor of a cellular telephone, though it may be other shapes and sizes in further examples. The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12. As explained hereinafter, hub computing system 12 may be omitted in further embodiments to provide a completely mobile mixed reality experience using only the head mounted displays and processing units 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes a capture device 20 for capturing image data from portions of a scene within its field of view (FOV). As used herein, a scene is the environment in which the users move around, which environment is captured within the FOV of the capture device 20 and/or the FOV of each head mounted display device 2. FIG. 1 shows a single capture device 20, but there may be multiple capture devices in further embodiments which cooperate to collectively capture image data from a scene within the composite FOVs of the multiple capture devices 20. Capture device 20 may include one or more cameras that visually monitor the one or more users 18a, 18b, 18c and the surrounding space such that gestures and/or movements performed by the one or more users, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, a component video cable, RCA cables, etc. In one example, audiovisual device 16 includes internal speakers. In other embodiments, audiovisual device 16 and hub computing system 12 may be connected to external speakers 22.

Hub computing system 12, with capture device 20, may be used to recognize, analyze, and/or track human (and other types of) targets. For example, one or more of the users 18a, 18b and 18c wearing head mounted display devices 2 may be tracked using the capture device 20 such that the gestures and/or movements of the users may be captured to animate one or more avatars or on-screen characters. The movements may also or alternatively be interpreted as controls that may be used to affect the application being executed by hub computing system 12. The hub computing system 12, together with the head mounted display devices 2 and processing units 4, may also together provide a mixed reality experience where one or more virtual images, such as virtual image 21 in FIG. 1, may be mixed together with real world objects in a scene.

FIGS. 2 and 3 show perspective and side views of the head mounted display device 2. FIG. 3 shows only the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light-guide optical element 115. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a virtual image and lens 122 for directing images from microdisplay 120 into light-guide optical element 115. In one embodiment, lens 122 is a collimating lens.

Control circuits 136 provide various electronics that support the other components of head mounted display device 2. More details of control circuits 136 are provided below with respect to FIG. 4. Inside or mounted to temple 102 are ear phones 130, inertial sensors 132 and temperature sensor 138. In one embodiment shown in FIG. 4, inertial sensors 132 include a three axis magnetometer 132A, three axis gyro 132B and three axis accelerometer 132C. The inertial sensors 132 are for sensing position, orientation, and sudden accelerations (pitch, roll and yaw) of head mounted display device 2. The inertial sensors may collectively be referred to below as the inertial measurement unit 132 or IMU 132. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light-guide optical element can be found in U.S. Patent Publication No. 2008/0285140, entitled "Substrate-Guided Optical Devices," published on Nov. 20, 2008, incorporated herein by reference in its entirety. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. Details of an opacity filter such as filter 114 are provided in U.S. patent application Ser. No. 12/887,426, entitled "Opacity Filter For See-Through Mounted Display," filed on Sep. 21, 2010, incorporated herein by reference in its entirety. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel, up to the resolution of the LCD.

A mask of alpha values can be used from a rendering pipeline, after z-buffering with proxies for real-world objects. When the system renders a scene for the augmented reality display, it takes note of which real-world objects are in front of which virtual objects as explained below. If a virtual object is in front of a real-world object, then the opacity should be on for the coverage area of the virtual object. If the virtual object is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 3), which will include an eye tracking illumination device 134A and eye tracking camera 134B (see FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008, incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 only shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 4:
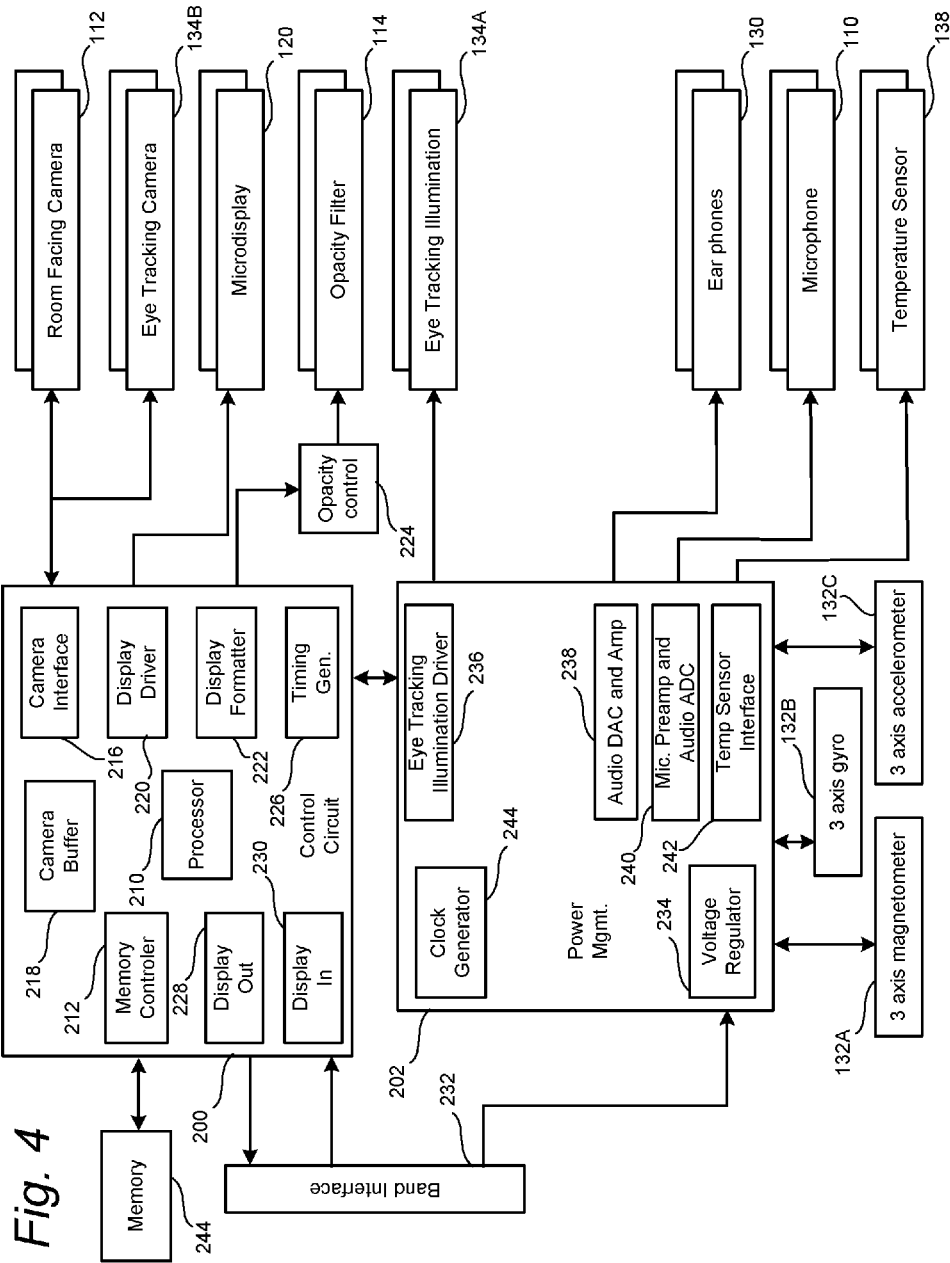
FIG. 4 is a block diagram of one embodiment of the components of a head mounted display unit.
Figure 5:
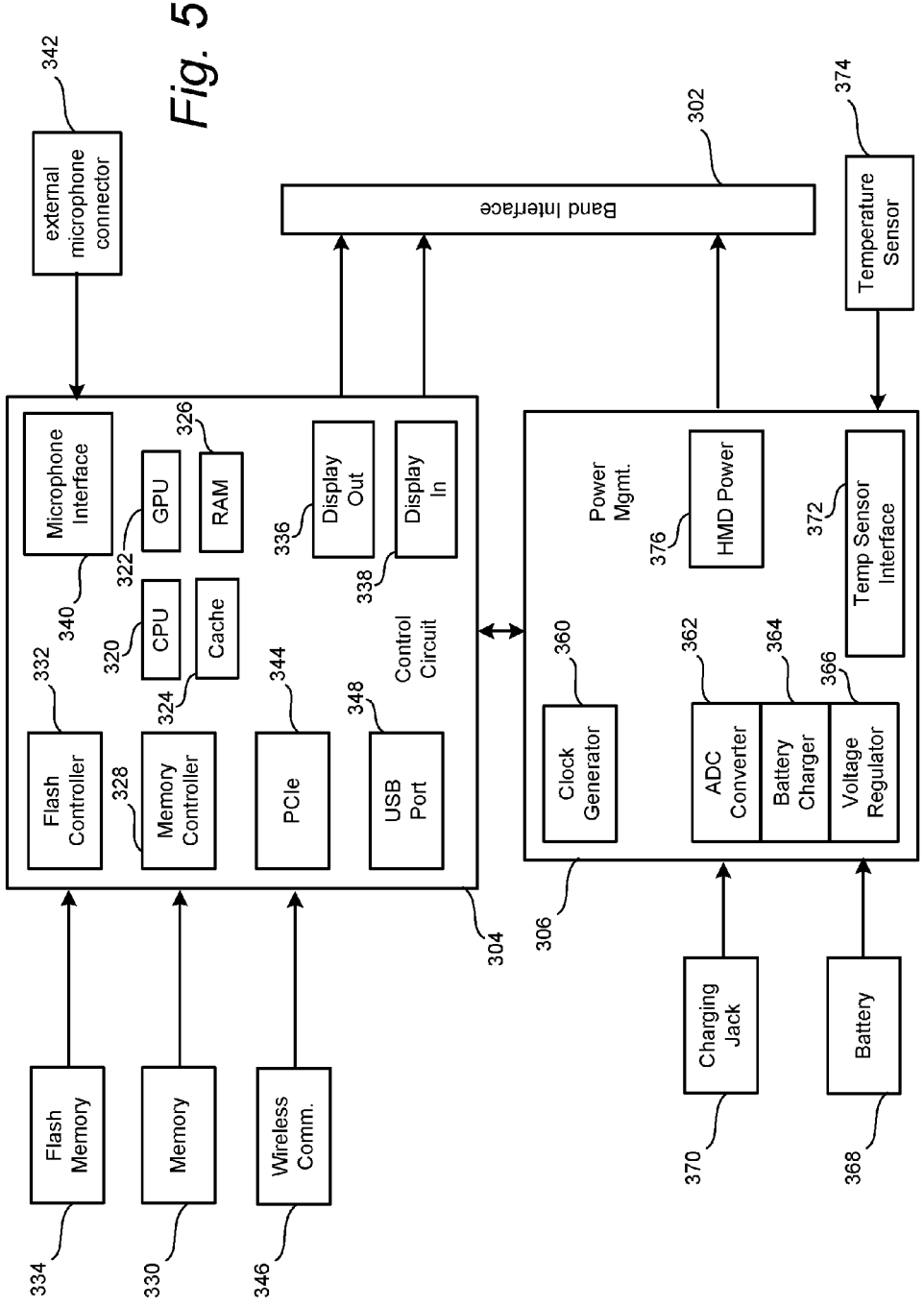
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4, the components of which are depicted in FIG. 4, will receive the sensory information from head mounted display device 2 and will exchange information and data with the hub computing system 12 (FIG. 1). Based on that exchange of information and data, processing unit 4 will determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 134) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 226 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out 228 is a buffer for providing images from room-facing cameras 112 to the processing unit 4. Display in 230 is a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 134. Power management unit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit 320, graphics processing unit 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing system 12 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power interface 376 provides power to the head mounted display device 2.

Figure 6:
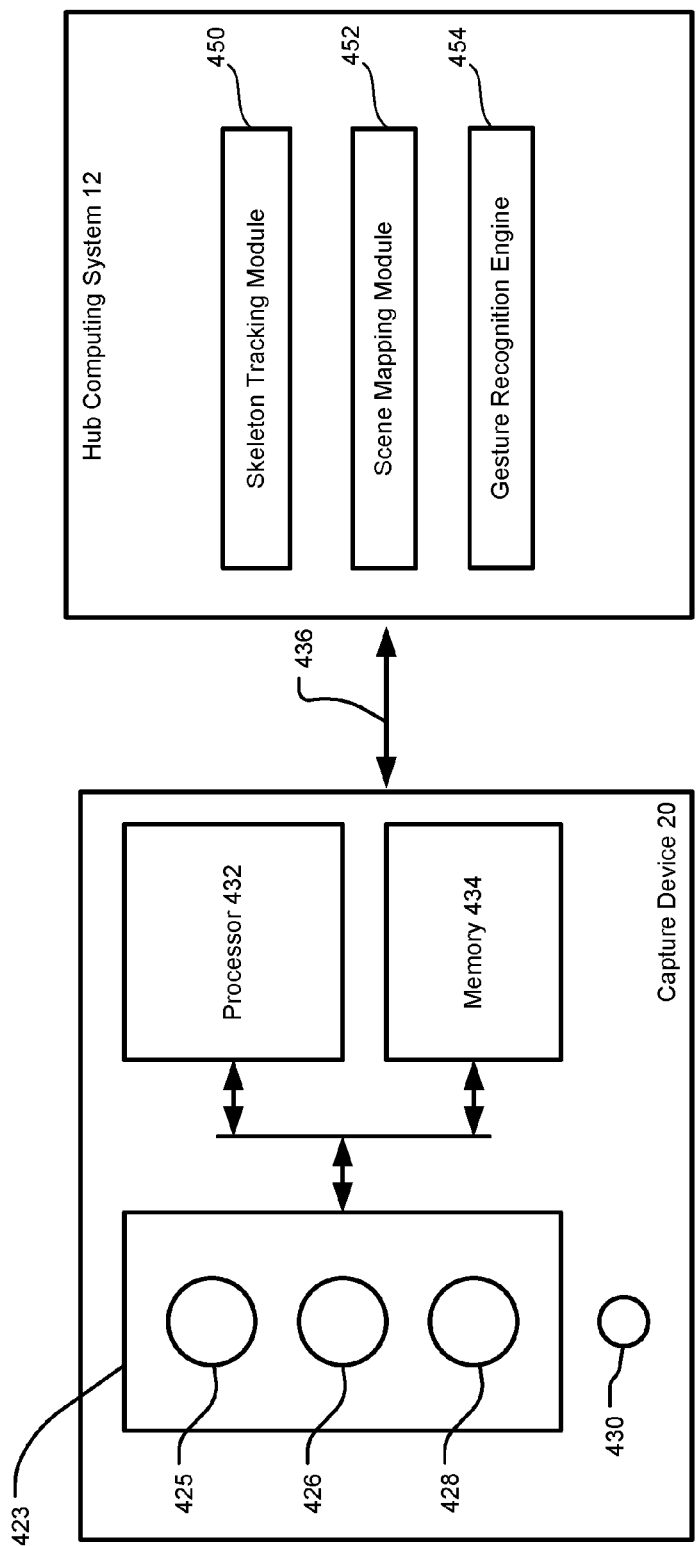
FIG. 6 is a block diagram of one embodiment of the components of a hub computing system used with head mounted display unit.

FIG. 6 illustrates an example embodiment of hub computing system 12 with a capture device 20. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 6, capture device 20 may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20 may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, capture device 20 may use a structured light to capture depth information. In such an analysis, patterned light (i.e., light displayed as a known pattern such as a grid pattern, a stripe pattern, or different pattern) may be projected onto the scene via, for example, the IR light component 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 426 and 428 so triangulation can be used to determined distance from cameras 426 and 428. In some implementations, the capture device 20 will include a dedicated IR sensor to sense the IR light, or a sensor with an IR filter.

According to another embodiment, one or more capture devices 20 may include two or more physically separated cameras that may view a scene from different angles to obtain visual stereo data that may be resolved to generate depth information. Other types of depth image sensors can also be used to create a depth image.

The capture device 20 may further include a microphone 430, which includes a transducer or sensor that may receive and convert sound into an electrical signal. Microphone 430 may be used to receive audio signals that may also be provided to hub computing system 12.

In an example embodiment, the capture device 20 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 6, in one embodiment, memory 434 may be a separate component in communication with the image camera component 423 and processor 432. According to another embodiment, the memory 434 may be integrated into processor 432 and/or the image camera component 423.

Capture device 20 is in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20 that may be used to determine when to capture, for example, a scene via the communication link 436. Additionally, the capture device 20 provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes a skeletal tracking module 450. Module 450 uses the depth images obtained in each frame from capture device 20, and possibly from cameras on the one or more head mounted display devices 2, to develop a representative model of each user 18a, 18b, 18c (or others) within the FOV of capture device 20 as each user moves around in the scene. This representative model may be a skeletal model described below. Hub computing system 12 may further include a scene mapping module 452. Scene mapping module 452 uses depth and possibly RGB image data obtained from capture device 20, and possibly from cameras on the one or more head mounted display devices 2, to develop a map or model of the scene in which the users 18a, 18b, 18c exist. The scene map may further include the positions of the users obtained from the skeletal tracking module 450. The hub computing system may further include a gesture recognition engine 454 for receiving skeletal model data for one or more users in the scene and determining whether the user is performing a predefined gesture or application-control movement affecting an application running on hub computing system 12.

The skeletal tracking module 450 and scene mapping module 452 are explained in greater detail below. More information about gesture recognition engine 454 can be found in U.S. patent application Ser. No. 12/422,661, entitled "Gesture Recognizer System Architecture," filed on Apr. 13, 2009, incorporated herein by reference in its entirety. Additional information about recognizing gestures can also be found in U.S. patent application Ser. No.

12/391,150, entitled "Standard Gestures," filed on Feb. 23, 2009; and U.S. patent application Ser. No. 12/474,655, entitled "Gesture Tool" filed on May 29, 2009, both of which are incorporated herein by reference in their entirety.

Capture device 20 provides RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as the distance of an object in the captured scene from the capture device. Hub computing system 12 will use the RGB images and depth images to develop a skeletal model of a user and to track a user's or other object's movements. There are many methods that can be used to model and track the skeleton of a person with depth images. One suitable example of tracking a skeleton using depth image is provided in U.S. patent application Ser. No. 12/603,437, entitled "Pose Tracking Pipeline" filed on Oct. 21, 2009, (hereinafter referred to as the '437 Application), incorporated herein by reference in its entirety.

The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for user modeling and tracking can also be used. Suitable tracking technologies are also disclosed in the following four U.S. patent applications, all of which are incorporated herein by reference in their entirety: U.S. patent application Ser. No. 12/475,308, entitled "Device for Identifying and Tracking Multiple Humans Over Time," filed on May 29, 2009; U.S. patent application Ser. No. 12/696,282, entitled "Visual Based Identity Tracking," filed on Jan. 29, 2010; U.S. patent application Ser. No. 12/641,788, entitled "Motion Detection Using Depth Images," filed on Dec. 18, 2009; and U.S. patent application Ser. No. 12/575,388, entitled "Human Tracking System," filed on Oct. 7, 2009.

The above-described hub computing system 12, together with the head mounted display device 2 and processing unit 4, are able to insert a virtual three-dimensional object into the field of view of one or more users so that the virtual three-dimensional object augments and/or replaces the view of the real world. In one embodiment, head mounted display device 2, processing unit 4 and hub computing system 12 work together as each of the devices includes a subset of sensors that are used to obtain the data necessary to determine where, when and how to insert the virtual three-dimensional object. In one embodiment, the calculations that determine where, when and how to insert a virtual three-dimensional object are performed by the hub computing system 12 and processing unit 4 working in tandem with each other. However, in further embodiments, all calculations may be performed by the hub computing system 12 working alone or the processing unit(s) 4 working alone. In other embodiments, at least some of the calculations can be performed by a head mounted display device 2.

In one example embodiment, hub computing system 12 and processing units 4 work together to create the scene map or model of the environment that the one or more users are in and track various moving objects in that environment. In addition, hub computing system 12 and/or processing unit 4 track the FOV of a head mounted display device 2 worn by a user 18a, 18b, 18c by tracking the position and orientation of the head mounted display device 2. Sensor information obtained by head mounted display device 2 is transmitted to processing unit 4. In one example, that information is transmitted to the hub computing system 12 which updates the scene model and transmits it back to the processing unit. The processing unit 4 then uses additional sensor information it receives from head mounted display device 2 to refine the field of view of the user and provide instructions to head mounted display device 2 on where, when and how to insert the virtual three-dimensional object. Based on sensor information from cameras in the capture device 20 and head mounted display device(s) 2, the scene model and the tracking information may be periodically updated between hub computing system 12 and processing unit 4 in a closed loop feedback system as explained below.

Figure 7:
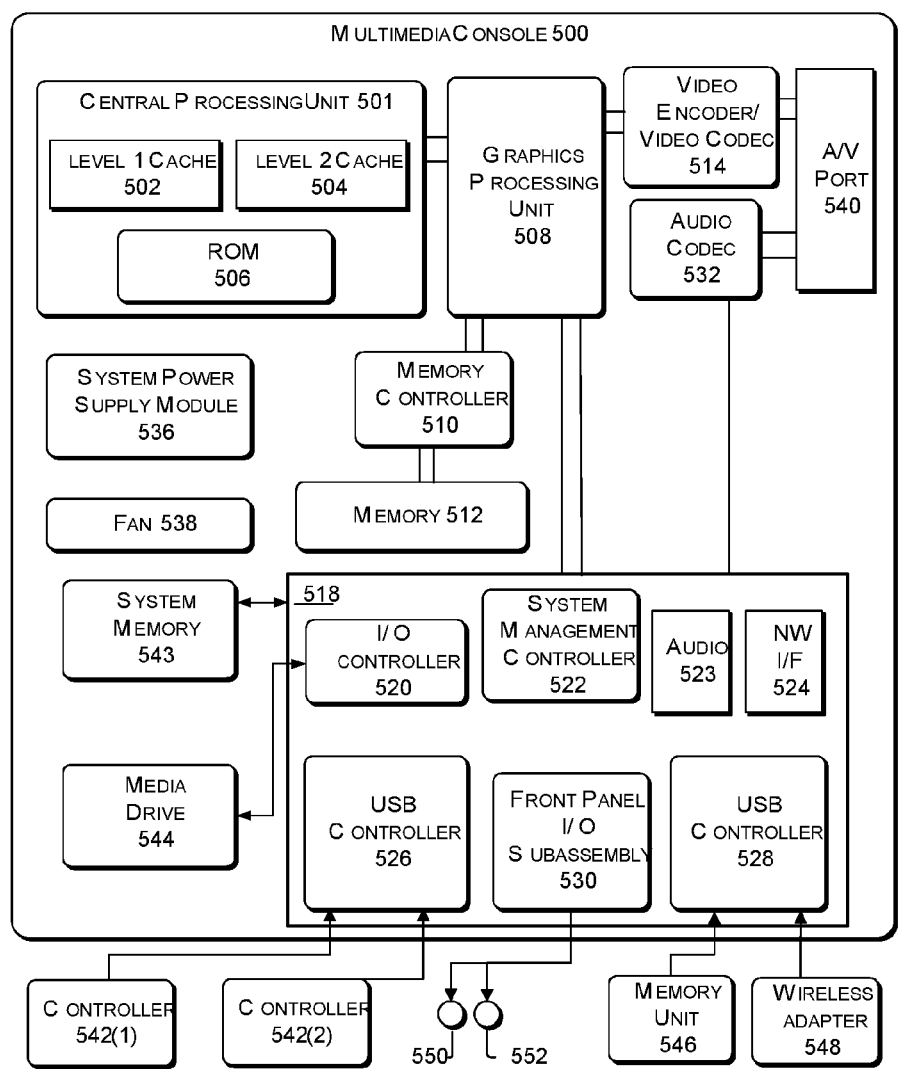
FIG. 7 is a block diagram of one embodiment of a computing system that can be used to implement the hub computing system described herein.

FIG. 7 illustrates an example embodiment of a computing system that may be used to implement hub computing system 12. As shown in FIG. 7, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface controller 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the console 500 via USB controller 526 or other interface. In other embodiments, hub computing system 12 can be implemented using other hardware architectures. No one hardware architecture is required.

Each of the head mounted display devices 2 and processing units 4 (collectively referred to at times as the mobile display device) shown in FIG. 1 are in communication with one hub computing system 12 (also referred to as the hub 12). There may be one, two or more than three mobile display devices in communication with the hub 12 in further embodiments. Each of the mobile display devices may communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs 12, with each hub including one or more mobile display devices. The hubs can communicate with each other directly or via the Internet (or other networks). Such an embodiment is disclosed in U.S. patent application Ser. No. 12/905,952, entitled "Fusing Virtual Content Into Real Content," to Flaks et al., filed Oct. 15, 2010, which application is incorporated by reference herein in its entirety.

Moreover, in further embodiments, the hub 12 may be omitted altogether. Such an embodiment is shown for example in FIG. 8. This embodiment may include one, two or more than three mobile display devices 580 in further embodiments. One benefit of such an embodiment is that the mixed reality experience of the present system becomes completely mobile, and may be used in both indoor or outdoor settings.

Figure 8:
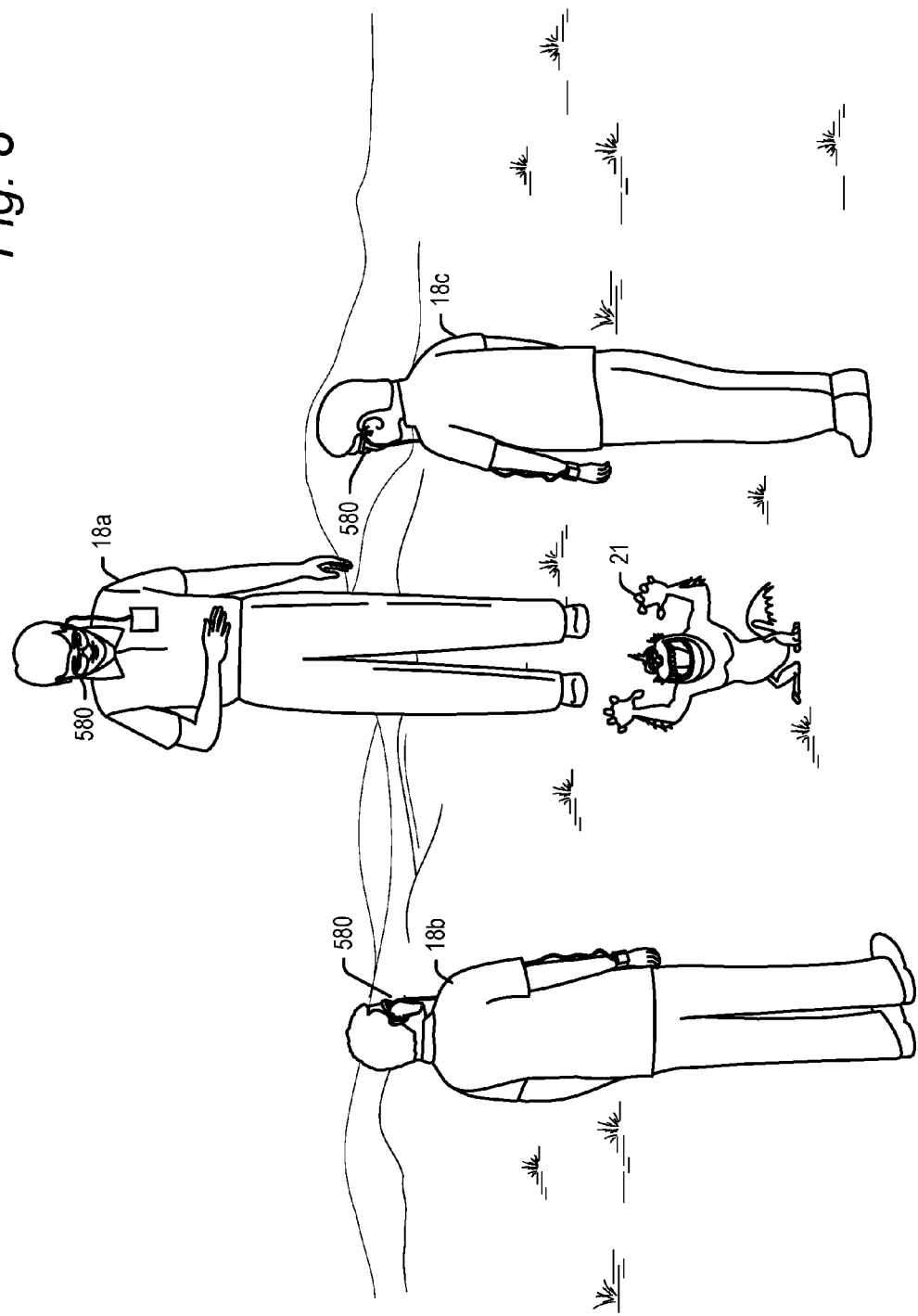
FIG. 8 is an illustration of example components of a mobile embodiment of a system for presenting a mixed reality environment to one or more users in an outdoors setting.

In the embodiment of FIG. 8, all functions performed by the hub 12 in the description that follows may alternatively be performed by one of the processing units 4, some of the processing units 4 working in tandem, or all of the processing units 4 working in tandem. In such an embodiment, the respective mobile display devices 580 perform all functions of system 10, including generating and updating state data, a scene map, each user's view of the scene map, all texture and rendering information, video and audio data, and other information necessary to perform the operations described herein. The embodiments described below with respect to the flowchart of FIG. 9 include a hub 12. However, in each such embodiment, one or more of the processing units 4 may alternatively perform all described functions of the hub 12.

Figure 9:
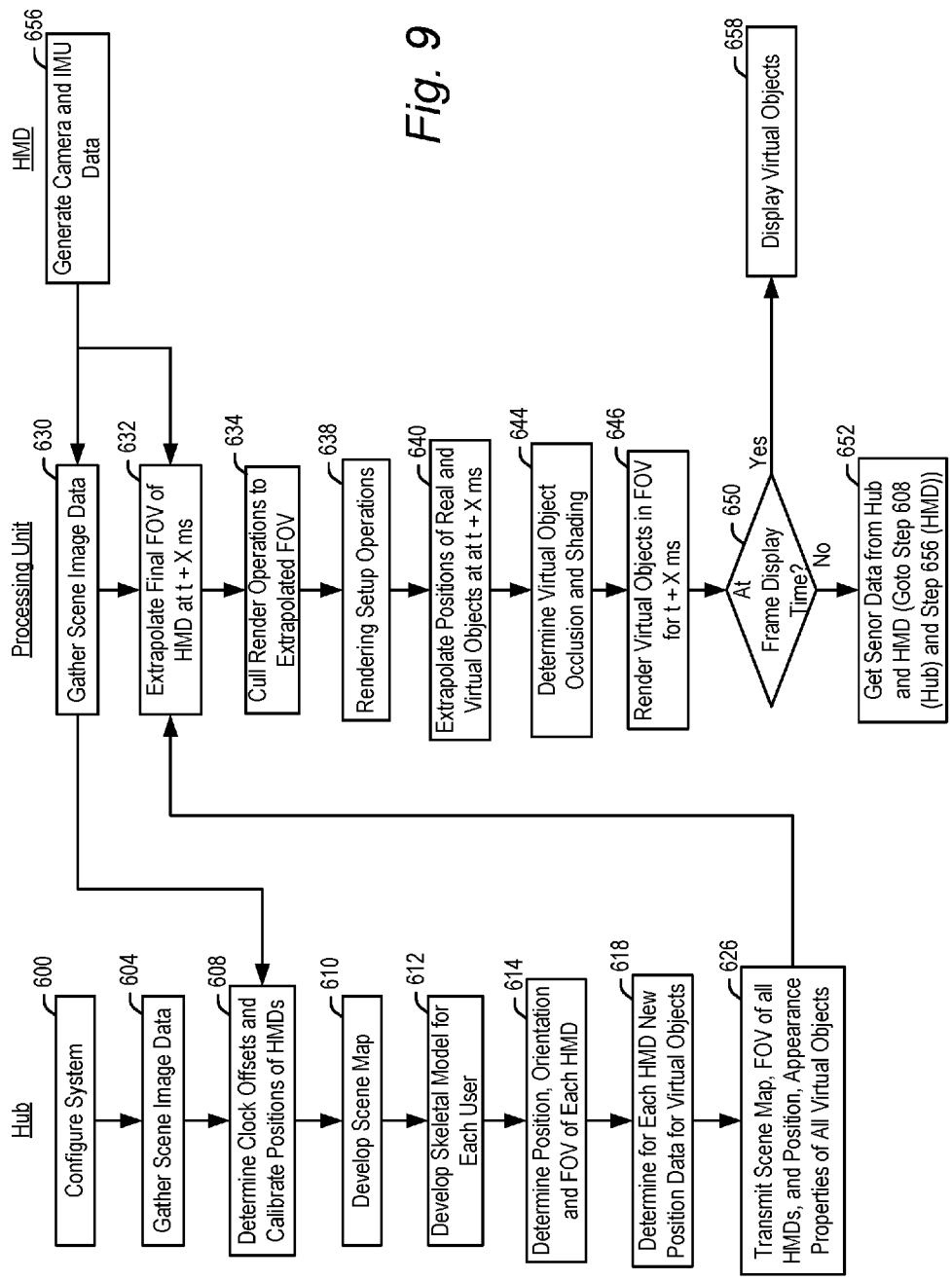
FIG. 9 is a flowchart showing the operation and collaboration of the hub computing system, one or more processing units and one or more head mounted display units of the present system.
Figure 10:
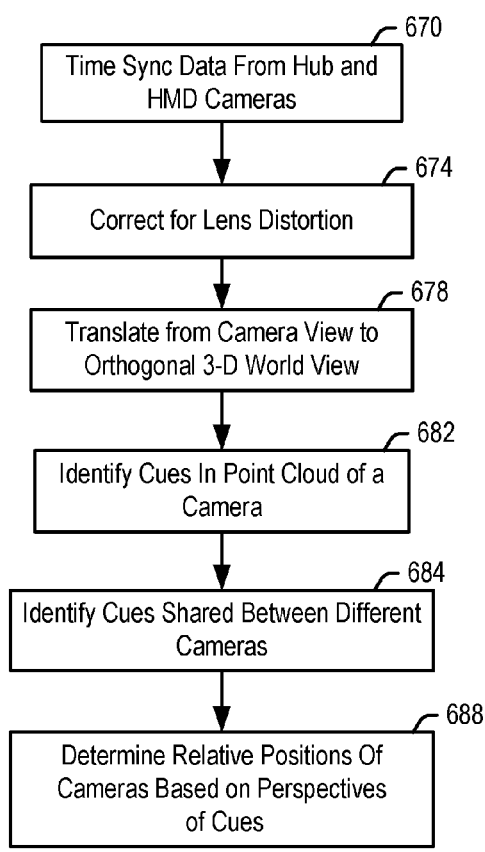

FIG. 9 is high level flowchart of the operation and interactivity of the hub computing system 12, the processing unit 4 and head mounted display device 2 during a discrete time period such as the time it takes to generate, render and display a single frame of image data to each user. In embodiments, data may be refreshed at a rate of 60 hertz, though it may be refreshed more often or less often in further embodiments.

In general, the system generates a scene map having x, y, z coordinates of the environment and objects in the environment such as users, real world objects and virtual objects. The virtual object may be virtually placed in the environment for example by an application running on hub computing system 12. The system also tracks the FOV of each user. While all users may possibly be viewing the same aspects of the scene, they are viewing them from different perspectives. Thus, the system generates each person's unique field of view of the scene to adjust for parallax and occlusion of virtual or real world objects, which may again be different for each user.

For a given frame of image data, a user's view may include one or more real and/or virtual objects. As a user turns his head, for example left to right or up and down, the relative position of real world objects in the user's field of view inherently moves within the user's field of view. However, the display of virtual objects to a user as the user moves his head is a more difficult problem. In an example where a user is looking at a stationary virtual object in his FOV, if the user moves his head left to move the FOV left, the display of the virtual object needs to be shifted to the right by an amount of the user's FOV shift, so that the net effect is that the virtual three-dimensional object remains stationary within the FOV. It becomes more difficult when virtual objects themselves, as well as other users, may also be moving in the scene, possibly occluding a user's view of objects in the scene. A system for accomplishing these operations is explained below with respect to the flowchart of FIGS. 9-16 below.

The system for presenting mixed reality to one or more users 18a, 18b and 18c may be configured in step 600. For example, a user 18a, 18b, 18c or other user or operator of the system may specify the virtual objects that are to be presented, as well as how, when and where they are to be presented. In an alternative embodiment, an application running on hub 12 and/or processing unit 4 can configure the system as to the virtual objects that are to be presented.

In steps 604 and 630, hub 12 and processing unit 4 gather data from the scene. For the hub 12, this may be image and audio data sensed by the depth camera 426, RGB camera 428 and microphone 430 of capture device 20. For the processing unit 4, this may be image data sensed in step 652 by the head mounted display device 2, and in particular, by the cameras 112, the eye tracking assemblies 134 and the IMU 132. The data gathered by the head mounted display device 2 is sent to the processing unit 4 in step 656. The processing unit 4 processes this data, as well as sending it to the hub 12 in step 630.

In step 608, the hub 12 performs various setup operations that allow the hub 12 to coordinate the image data of its capture device 20 and the one or more processing units 4. In particular, even if the position of the capture device 20 is known with respect to a scene (which it may not be), the cameras on the head mounted display devices 2 are moving around in the scene. Therefore, in embodiments, the positions and time capture of each of the imaging cameras need to be calibrated to the scene, each other and the hub 12. Further details of step 608 are described below in the flowchart of FIG. 10.

One operation of step 608 includes determining clock offsets of the various imaging devices in the system 10 in a step 670. In particular, in order to coordinate the image data from each of the cameras in the system, it is necessary to ensure that the image data being coordinated is from the same time. Details relating to determining clock offsets and synching of image data are disclosed in U.S. patent application Ser. No. 12/772,802, entitled "Heterogeneous Image Sensor Synchronization," filed May 3, 2010, and U.S. patent application Ser. No. 12/792,961, entitled "Synthesis Of Information From Multiple Audiovisual Sources," filed Jun. 3, 2010, which applications are incorporated herein by reference in their entirety. In general, the image data from capture device 20 and the image data coming in from the one or more processing units 4 is time stamped off a single master clock in hub 12. Using the time stamps for all such data for a given frame, as well as the known resolution for each of the cameras, the hub 12 determines the time offsets for each of the imaging cameras in the system. From this, the hub 12 may determine the differences between, and a required adjustment to, the images received from each camera.

The hub 12 may select a reference time stamp from one of the cameras' received frame. The hub 12 may then add time to or subtract time from the received image data from all other cameras to synch to the reference time stamp. It is appreciated that a variety of other operations may be used for determining time offsets and/or synchronizing the different cameras together for the calibration process. The determination of time offsets may be performed once, upon initial receipt of image data from all the cameras. Alternatively, it may be performed periodically, such as for example each frame or some number of frames.

Step 608 further includes the operation of calibrating the positions of all cameras with respect to each other in the x, y, z Cartesian space of the scene. Once this information is known, the hub 12 and/or the one or more processing units 4 is able to form a scene map or model identify the geometry of the scene and the geometry and positions of objects (including users) within the scene. In calibrating the image data of all cameras to each other, depth and/or RGB data may be used. Technology for calibrating camera views using RGB information alone is described for example in U.S. Patent Publication No. 2007/0110338, entitled "Navigating Images Using Image Based Geometric Alignment and Object Based Controls," published May 17, 2007, which publication is incorporated herein by reference in its entirety.

The imaging cameras in system 10 may each have some lens distortion which needs to be corrected for in order to calibrate the images from different cameras Once all image data from the various cameras in the system is received in steps 604 and 630, the image data may be adjusted to account for lens distortion for the various cameras in step 674. The distortion of a given camera (depth or RGB) may be a known property provided by the camera manufacturer. If not, algorithms are known for calculating a camera's distortion, including for example imaging an object of known dimensions such as a checker board pattern at different locations within a camera's field of view. The deviations in the camera view coordinates of points in that image will be the result of camera lens distortion. Once the degree of lens distortion is known, distortion may be corrected by known inverse matrix transformations that result in a uniform camera view map of points in a point cloud for a given camera.

The hub 12 may next translate the distortion-corrected image data points captured by each camera from the camera view to an orthogonal 3-D world view in step 678. This orthogonal 3-D world view is a point cloud map of all image data captured by capture device 20 and the head mounted display device cameras in an orthogonal x, y, z Cartesian coordinate system. The matrix transformation equations for translating camera view to an orthogonal 3-D world view are known. See, for example, David H. Eberly, "3d Game Engine Design: A Practical Approach To Real-Time Computer Graphics," Morgan Kaufman Publishers (2000), which publication is incorporated herein by reference in its entirety. See also, U.S. patent application Ser. No. 12/792,961, previously incorporated by reference.

Each camera in system 10 may construct an orthogonal 3-D world view in step 678. The x, y, z world coordinates of data points from a given camera are still from the perspective of that camera at the conclusion of step 678, and not yet correlated to the x, y, z world coordinates of data points from other cameras in the system 10. The next step is to translate the various orthogonal 3-D world views of the different cameras into a single overall 3-D world view shared by all cameras in system 10.

To accomplish this, embodiments of the hub 12 may next look for key-point discontinuities, or cues, in the point clouds of the world views of the respective cameras in step 682, and then identifies cues that are the same between different point clouds of different cameras in step 684. Once the hub 12 is able to determine that two world views of two different cameras include the same cues, the hub 12 is able to determine the position, orientation and focal length of the two cameras with respect to each other and the cues in step 688. In embodiments, not all cameras in system 10 will share the same common cues. However, as long as a first and second camera have shared cues, and at least one of those cameras has a shared view with a third camera, the hub 12 is able to determine the positions, orientations and focal lengths of the first, second and third cameras relative to each other and a single, overall 3-D world view. The same is true for additional cameras in the system.

Various known algorithms exist for identifying cues from an image point cloud. Such algorithms are set forth for example in Mikolajczyk, K., and Schmid, C., "A Performance Evaluation of Local Descriptors," IEEE Transactions on Pattern Analysis & Machine Intelligence, 27, 10, 1615-1630. (2005), which paper is incorporated by reference herein in its entirety. A further method of detecting cues with image data is the Scale-Invariant Feature Transform (SIFT) algorithm. The SIFT algorithm is described for example in U.S. Pat. No. 6,711,293, entitled, "Method and Apparatus for Identifying Scale Invariant Features in an Image and Use of Same for Locating an Object in an Image," issued Mar. 23, 2004, which patent is incorporated by reference herein in its entirety. Another cue detector method is the Maximally Stable Extremal Regions (MSER) algorithm. The MSER algorithm is described for example in the paper by J. Matas, O. Chum, M. Urba, and T. Pajdla, "Robust Wide Baseline Stereo From Maximally Stable Extremal Regions," Proc. of British Machine Vision Conference, pages 384-396 (2002), which paper is incorporated by reference herein in its entirety.

In step 684, cues which are shared between point clouds from two or more cameras are identified. Conceptually, where a first set of vectors exist between a first camera and a set of cues in the first camera's Cartesian coordinate system, and a second set of vectors exist between a second camera and that same set of cues in the second camera's Cartesian coordinate system, the two systems may be resolved with respect to each other into a single Cartesian coordinate system including both cameras. A number of known techniques exist for finding shared cues between point clouds from two or more cameras. Such techniques are shown for example in Arya, S., Mount, D. M., Netanyahu, N. S., Silverman, R., and Wu, A. Y., "An Optimal Algorithm For Approximate Nearest Neighbor Searching Fixed Dimensions," Journal of the ACM 45, 6, 891-923 (1998), which paper is incorporated by reference herein in its entirety. Other techniques can be used instead of, or in addition to, the approximate nearest neighbor solution of Arya et al., incorporated above, including but not limited to hashing or context-sensitive hashing.

Where the point clouds from two different cameras share a large enough number of matched cues, a matrix correlating the two point clouds together may be estimated, for example by Random Sampling Consensus (RANSAC), or a variety of other estimation techniques. Matches that are outliers to the recovered fundamental matrix may then be removed. After finding a set of assumed, geometrically consistent matches between a pair of point clouds, the matches may be organized into a set of tracks for the respective point clouds, where a track is a set of mutually matching cues between point clouds. A first track in the set may contain a projection of each common cue in the first point cloud. A second track in the set may contain a projection of each common cue in the second point cloud. Using the information from steps 448 and 450, the point clouds from different cameras may be resolved into a single point cloud in a single orthogonal 3-D real world view.

The positions and orientations of all cameras are calibrated with respect to this single point cloud and single orthogonal 3-D real world view. In order to resolve the various point clouds together, the projections of the cues in the set of tracks for two point clouds are analyzed. From these projections, the hub 12 can determine the perspective of a first camera with respect to the cues, and can also determine the perspective of a second camera with respect to the cues. From that, the hub 12 can resolve the point clouds into a best estimate of a single point cloud and single orthogonal 3-D real world view containing the cues and other data points from both point clouds.

This process is repeated for any other cameras, until the single orthogonal 3-D real world view includes all cameras. Once this is done, the hub 12 can determine the relative positions and orientations of the cameras relative to the single orthogonal 3-D real world view and each other. The hub 12 can further determine the focal length of each camera with respect to the single orthogonal 3-D real world view.

Referring again to FIG. 9, once the system is calibrated in step 608, a scene map may be developed in step 610 identifying the geometry of the scene as well as the geometry and positions of objects within the scene. In embodiments, the scene map generated in a given frame may include the x, y and z positions of all users, real world objects and virtual objects in the scene. All of this information is obtained during the image data gathering steps 604, 656 and is calibrated together in step 608.

At least the capture device 20 includes a depth camera for determining the depth of the scene (to the extent it may be bounded by walls, etc.) as well as the depth position of objects within the scene. As explained below, the scene map is used in positioning virtual objects within the scene, as well as displaying virtual three-dimensional objects with the proper occlusion (a virtual three-dimensional object may be occluded or a virtual three-dimensional object may occlude a real world object or another virtual three-dimensional object). The system 10 may include multiple depth image cameras to obtain all of the depth images from a scene, or a single depth image camera, such as for example depth image camera 426 of capture device 20 may be sufficient to capture all depth image from a scene. An analogous method for determining a scene map within an unknown environment is known as simultaneous localization and mapping (SLAM). One example of SLAM is disclosed in U.S. Pat. No. 7,774,158, entitled "Systems and Methods for Landmark Generation for Visual Simultaneous Localization and Mapping," issued Aug. 10, 2010, which patent is incorporated herein by reference in its entirety.

Figure 11:
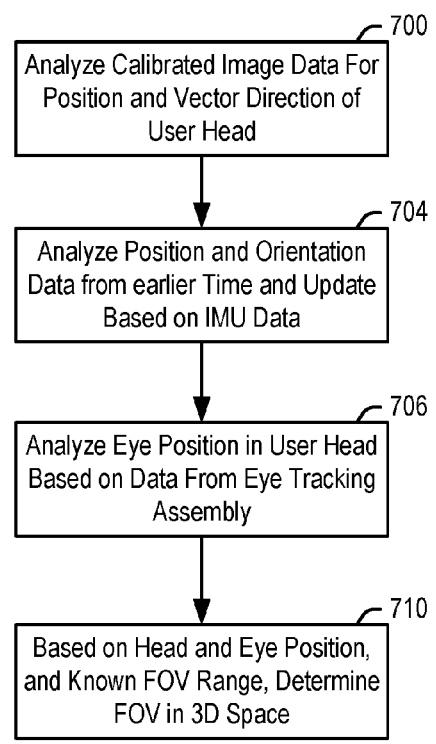

In step 612, the system will detect and track moving objects such as humans moving in the room, and update the scene map based on the positions of moving objects. This includes the use of skeletal models of the users within the scene as described above. In step 614, the hub determines the x, y and z position, the orientation and the FOV of each head mounted display device 2 for all users within the system 10. Further details of step 616 are described below with respect to the flowchart of FIG. 11. The steps of FIG. 11 are described below with respect to a single user. However, the steps of FIG. 11 would be carried out for each user within the scene.

In step 700, the calibrated image data for the scene is analyzed at the hub to determine both the user head position and a face unit vector looking straight out from a user's face. The head position is identified in the skeletal model. The face unit vector may be determined by defining a plane of the user's face from the skeletal model, and taking a vector perpendicular to that plane. This plane may be identified by determining a position of a user's eyes, nose, mouth, ears or other facial features. The face unit vector may be used to define the user's head orientation and may be considered the center of the FOV for the user. The face unit vector may also or alternatively be identified from the camera image data returned from the cameras 112 on head mounted display device 2. In particular, based on what the cameras 112 on head mounted display device 2 see, the associated processor 104 and/or hub 12 is able to determine the face unit vector representing a user's head orientation.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from capture device 12, the cameras on the head mounted display device 2 for the subject user and/or from the head mounted display device(s) 2 of other users.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the hub may further consider the position of the user's eyes in his head. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's field of view is also useful for determining what a user cannot see. As explained below, limiting processing of virtual objects to only those areas that a particular user can see improves processing speed and reduces latency.

In the embodiment described above, the hub 12 calculates the FOV of each user in the scene. In further embodiments, the processing unit 4 for a user may share in this task. For example, once user head position and eye orientation are estimated, this information may be sent to the processing unit which can update the position, orientation, etc. based on more recent data as to head position (from IMU 132) and eye position (from eye-tracking assembly 134).

Returning now to FIG. 9, an application running on hub 12 may have placed virtual objects in the scene. In step 618, the hub may use the scene map and any application-defined movement of the virtual objects, to determine the x, y and z positions of all such virtual objects at the current time. Alternatively, this information may be generated by one or more of the processing units 4 and sent to the hub 12 in step 618.

Further details of step 618 are shown in the flowchart of FIG. 12. In step 714, the hub determines whether the virtual three-dimensional object is user dependent. That is, some virtual objects may be animated independently of any user. They may be added by the application and interact with the user, but their position is not dependent on a particular user (aside from collision detection explained below). An example of this is shown as virtual objects 804 and 806 in FIG. 17, explained below.

On the other hand, certain virtual three-dimensional object may be added that are user dependent. These virtual objects may be provided to augment a user. They may be provided around or over a user. For example, a halo or fire or light, etc. may be provided around an outline of a user. Text, such as a user name, contact info or other information about a user may be displayed over a user. A user may be fitted with a virtual article of clothing, such as a jacket, slacks or hat. As a further alternative, the virtual three-dimensional object may be provided over a user to alter a certain aspect of a user. The user's hair or clothes may be altered, or the virtual three-dimensional object may turn the user a certain color. An example of this is shown as virtual object 850 in FIG. 18, explained below. As indicated above, the type of virtual object added may be controlled by an application running on hub 12 and/or processing unit(s) 4. However, the positioning of the virtual object may be calculated by hub 12 in communication with the application based in part on whether the virtual object is user dependent or independent.

Accordingly, in step 714, the hub 12 may check whether a virtual three-dimensional object to be added to a scene is user-dependent. If not, the hub calculates a new position of the virtual three-dimensional object in step 718 based on one or more application metrics. For example, the application may set whether and how fast the virtual three-dimensional object is moving in a scene. It may determine a change in shape, appearance or orientation of the virtual three-dimensional object. The application may affect a variety of other changes to a virtual object. These changes are provided to the hub in step 718, and the hub can then update the position, orientation, shape, appearance, etc. of the virtual three-dimensional object in step 718. In step 720, the hub may check whether the updated virtual object occupies the same space as a real world object in the scene. In particular, all pixel positions of real world objects in the scene are known and all pixel positions of the updated virtual object are also known. If there is any overlap, the hub 12 may adjust the position of the virtual object according to default rules or metrics defined in the application.

If it is determined in step 714 that the virtual three-dimensional object is associated with a particular user, then the hub performs a step 724 of updating the position, orientation, shape appearance, etc. based at least in part on the updated position of that user. The skeletal model provides a volumetric description of a user, including a pixel-pixel description of the user in x, y, z Cartesian coordinate space. Using this skeletal model, the hub can alter the pixels around, above or within an outline of a user in accordance with the application metrics. It need not be a body outline of a user. In further embodiments, particular body parts may be defined as having an associated virtual three-dimensional object, so that the virtual object moves with that body part.

The steps 714 through 724 for providing the updated position, orientation, shape, appearance, etc. of each virtual object is user-viewpoint agnostic. That is, the steps 714 through 724 do not depend on the specific FOVs of the users. These steps merely define the 3D position in the x, y, z Cartesian space that the virtual objects are to occupy. This information may be incorporated into the screen map for that frame.

Once the above steps 600 through 618 have been performed, the hub 12 may transmit the determined information to the one or more processing units 4 in step 626. The information transmitted in step 626 includes transmission of the scene map to the processing units 4 of all users. The transmitted information may further include transmission of the determined FOV of each head mounted display device 2 to the processing units 4 of the respective head mounted display devices 2. The transmitted information may further include transmission of virtual object characteristics, including the determined position, orientation, shape, appearance and occlusion properties (i.e., whether the virtual object blocks or is blocked by another object from a particular user's view).

The processing steps 600 through 626 are described above by way of example only. It is understood that one or more of these steps may be omitted in further embodiments, the steps may be performed in differing order, or additional steps may be added. The processing steps 604 through 618 may be computationally expensive but the powerful hub 12 may perform these steps several times in a 60 Hertz frame. In further embodiments, one or more of the steps 604 through 618 may alternatively or additionally be performed by one or more of the one or more processing units 4. Moreover, while FIG. 9 shows determination of various parameters, and then transmission of these parameters all at once in step 626, it is understood that determined parameters may be sent to the processing unit(s) 4 asynchronously as soon as they are determined.

Although not shown in the flowchart of FIG. 9, the hub 12 and/or processing unit(s) 4 may further identify objects within the scene. For example, the system may have user profiles that have visual images that can be matched to the images detected of the objects. Alternatively, a user profile can describe features of the person which can be match based on the depth images or visual images. In another embodiment, users may log into the system and hub 12 can use the login process to identify a particular user and track that user throughout the interaction described herein. The hub 12 may further have access to a database of known shapes. In this instance, the hub may match as many objects in the model to the shapes in the database. Where a user or object is identified, metadata may be added to the scene map identifying the user or object. For example the metadata may indicate that the particular object is a round shiny table, John Doe, green leather couch, etc.

The operation of the processing unit 4 and head mounted display device 2 will now be explained with reference to steps 630 through 658. In general, for each frame, a processing unit 4 extrapolates received data to predict the final position of objects in a scene, and the associated user's view of those objects, at a time in the future when the virtual objects are to be displayed to a user through the head mounted display device 2. The extrapolated prediction of the final FOV generated by the processing unit 4 may be continuously or repeatedly updated during a frame, based on data received from the hub 12 and head mounted display device 2. Given that there is inherent latency in determining the final FOV and virtual objects within the final FOV, extrapolating the data into the future allows the system to predict a view of the virtual objects at the time the virtual objects are to be displayed, thus effectively eliminating latency from the system. This feature is explained in greater detail below. The following description is of a single processing unit 4 and head mounted display device 2. However, the following description may apply to each processing unit 4 and display device 2 in the system.

As noted above, in an initial step 656, the head mounted display device 2 generates image and IMU data, which is sent to the hub 12 via the processing unit 4 in step 630. While the hub 12 is processing the image data, the processing unit 4 is also processing the image data, as well as performing steps in preparation for rendering an image. In step 632, the processing unit 4 may use state information from the past and/or present to extrapolate a state estimate of a future time when the head mounted display unit 2 presents a rendered frame of image data to the user of the head mounted display device 2. In particular, the processing unit in step 632 determines a prediction of the final FOV of the head mounted display device 2 at some time in the future when the image is to be displayed to the head mounted display device 2 for the current frame. Further details of step 632 are explained below with reference to the flowchart of FIG. 13.

In step 750, the processing unit 4 receives image and IMU data from the head mounted display device 2, and in step 752, the processing unit 4 receives processed image data including the scene map, the FOV of the head mounted display device 2 and occlusion data.

In step 756, the processing unit 4 calculates a time, X milliseconds (ms), from the current time, t, until the image is displayed through head mounted display device 2. In general, X may be up to 250 ms, though it may be more or less than that in further embodiments. Moreover, while embodiments are described below in terms of predicting X milliseconds out in to the future, it is understood that X may be described in units of time measurement larger or smaller than milliseconds. As the processing unit 4 cycles through its operations as explained below and gets closer to the time when an image is to be displayed for a given frame, the time period X gets smaller.

In step 760, the processing unit 4 extrapolates the final FOV of the head mounted display device 2 at the time when the image is to be displayed on the head mounted display device 2. Depending on the timing of the processing steps between the hub 12 and the processing unit 4, the processing unit 4 may not have received the data from the hub the first time the processing unit 4 performs step 632. In this instance, the processing unit may still be able to make these determinations where the cameras 112 in the head mounted display device 2 include a depth camera. If not, then the processing unit 4 may perform step 760 upon receipt of information from the hub 12.

Step 760 of extrapolating the final FOV is based on the fact that, over small time periods such as a few frames of data, movements tend to be generally smooth and steady. As such, by looking at data from the current time t, and data from previous times, it is possible to extrapolate into the future to predict the user's final view position when the frame image data is to be displayed. Using this prediction of the final FOV, the final FOV may be displayed to the user at t+X ms without any latency. The processing unit may cycle through its steps one or more times a frame, updating the extrapolation to narrow the possible solutions as the time within a frame to display the final FOV approaches.

Figure 14:
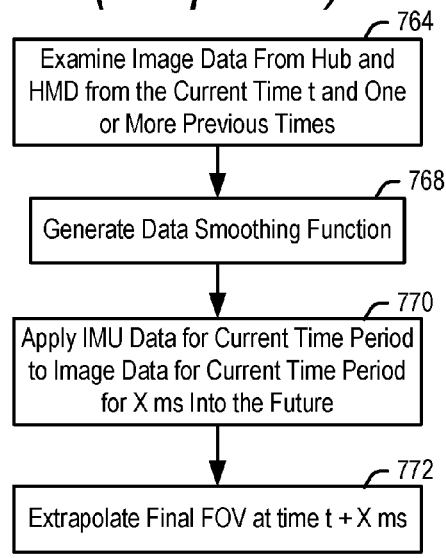

Further details of step 760 are provided in the flowchart of FIG. 14. In step 764, image data received from the hub 12 and/or the head mounted display device 2 relating to the FOV is examined. In step 768, a smoothing function may be applied to the examined data which captures a pattern in the head position data while ignoring noise or anomalous points of data. The number of time periods examined may be two or more distinct time periods.

In addition to or instead of steps 764 and 768, the processing unit 4 may perform a step 770 of using the current FOV data as ground truth for the head mounted display device 2, as indicated by the head mounted display device 2 and/or hub 12. The processing unit 104 may then apply the data from the IMU unit 132 for the current time period to determine the final field of view X ms into the future. The IMU unit 132 may provide kinematic measurements such as velocity, acceleration and jerk for movement of the head mounted display device 2 in six degrees of freedom: translation along three axes and rotation about three axes. Using these measurements for a current time period, it is a straightforward extrapolation to determine a net change from the current FOV position to a final field of view X ms into the future. Using the data from steps 764, 768 and 770, the final FOV at time t+X ms may be extrapolated in step 772.

In addition to predicting a final FOV of the head mounted display device 2 by extrapolating t+X ms into the future, the processing unit 104 may also determine a confidence value in the prediction, referred to herein as instantaneous prediction error. It may happen that a user is moving his head too rapidly for the processing unit 4 to extrapolate the data within an acceptable accuracy level. Where the instantaneous prediction error is above some predetermined threshold level, mitigation techniques may be employed instead of relying on the extrapolated prediction as to final view position. Mitigation techniques include reducing or turning off the display of the virtual images. While not ideal, the situation is likely temporary and may be preferable to presenting an image mismatch between the virtual and real images. Another mitigation technique is to fall back to the last data obtained having an acceptable instantaneous prediction error. Further mitigation techniques including blurring of the data (which may be a perfectly acceptable method of displaying virtual images for rapid head movements), and blending of one or more of the above-described mitigation techniques.

Referring again to the flowchart of FIG. 9, after extrapolating the final view in step 632, the processing unit 4 may next cull the rendering operations in step 634 so that only those virtual objects which could possibly appear within the final FOV of the head mounted display device 2 are rendered. The positions of other virtual objects may still be tracked, but they are not rendered. As explained below with respect to FIGS. 19 and 20, in an alternative embodiment, step 634 may include culling the rendering operations to the possible FOV, plus an additional border around the periphery of the FOV. This will allow image adjustment at a high frame rate without re-rendering of the data across the entire FOV. It is also conceivable that, in further embodiments, step 634 may be skipped altogether and the entire image is rendered.

The processing unit 4 may next perform a rendering setup step 638 where setup rendering operations are performed using the extrapolated final FOV prediction for time t+X ms. Step 638 performs setup rendering operations on the virtual three-dimensional objects to be rendered. In embodiments where the virtual object data is provided to the processing unit 4 from the hub 12, step 638 may be skipped until such time as the virtual object data is supplied to the processing unit 4 (for example, the first time through the processing unit steps).

Once virtual object data is received, the processing unit may perform rendering setup operations in step 638 for the virtual objects which may appear in the final FOV at time t+X ms. The setup rendering operations in step 638 may include common rendering tasks associated with the virtual object(s) to be displayed in the final FOV. These rendering tasks may include for example, shadow map generation, lighting, and animation. In embodiments, the rendering setup step 638 may further include a compilation of likely draw information such as vertex buffers, textures and states for virtual objects to be displayed in the predicted final FOV.

Figure 15:
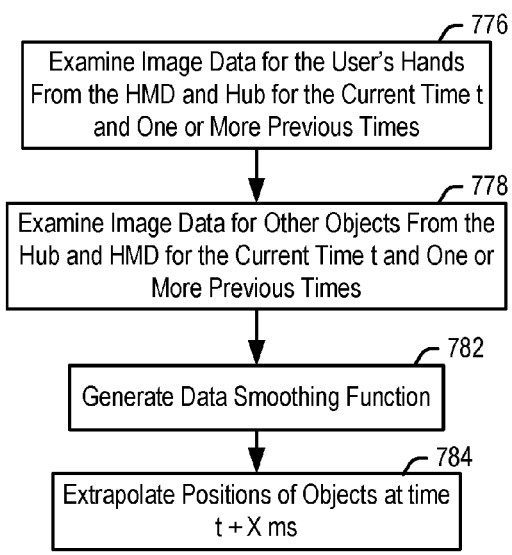

Step 632 determined a prediction of the FOV for the head mounted display device 2 at a time when a frame of image data is displayed on the head mounted display device. However, in addition to the FOV, virtual and real objects (such as the user's hands and other users) may be moving in the scene as well. Thus, in addition to extrapolating the final FOV position for each user at time t+X ms, the system may also extrapolate in step 640 the position for all objects (or all moving objects) in the scene for the time t+X ms, both real and virtual. This information may be helpful in order to properly display the virtual and real objects, and display them with the proper occlusions. Further details of the step 640 are shown in the flowchart of FIG. 15.

In step 776, the processing unit 4 may examine the position data for the position of a user's hands in x, y, z space from the current time t and previous times. This hand position data may come from the head mounted display device 2 and, possibly, from the hub 12. In step 778, the processing unit may similarly examine the position data for other objects in the scene at the current time t and previous times. In embodiments, the examined objects may be all objects in the scene, or only those that are identified as moving objects, such as people. In further embodiments, the examined objects may be limited to those calculated to be within the final FOV of the user at time t+X ms. The number of time periods examined in steps 776 and 778 may be two or more distinct time periods.

In step 782, a smoothing function may be applied to the examined data in steps 776 and 778 while ignoring noise or anomalous points of data. Using steps 776, 778 and 782, the processing unit may extrapolate the positions of the user's hands and other objects in the scene at time t+X ms into the future.

In one example, a user may be moving their hand in front of their eyes. By tracking this movement with data from the head mounted display device 2 and/or hub 12, the processing unit may predict the position of the user's hand when the image is to be displayed at time t+X ms, and any virtual objects in the user's FOV that are occluded by the user's hand at that time are properly displayed. As a further example, a virtual object may be "tagged" to the outline of another user in the scene. By tracking the movement of this tagged user with data from the hub 12 and/or head mounted display device 2, the processing unit may predict the position of the tagged user when the image is to be displayed at time t+X ms, and the associated virtual object may be properly displayed around the user's outline. Other examples are contemplated where the extrapolation of FOV data and object position data into the future allows virtual objects to be properly displayed in a user's FOV each frame without latency.

Referring again to FIG. 9, using the extrapolated positions of objects at time t+X ms, the processing unit 4 may next determine occlusions and shading in the user's predicted FOV in step 644. In particular, the screen map has x, y and z positions of all objects in the scene, including moving and non-moving objects and the virtual objects. Knowing the location of a user and their line of sight to objects in the FOV, the processing unit 104 may then determine whether a virtual object partially or fully occludes the user's view of a real world object. Additionally, the processing unit 104 may determine whether a real world object partially or fully occludes the user's view of a virtual object. Occlusions are user-specific. A virtual object may block or be blocked in the view of a first user, but not a second user. Accordingly, occlusion determinations may be performed in the processing unit 104 of each user. However, it is understood that occlusion determinations may additionally or alternatively be performed by the hub 112.

In step 646, using the predicted final FOV and predicted object positions and occlusions, the GPU 322 of processing unit 4 may next render an image to be displayed to the user at the time t+X ms. Portions of the rendering operations may have already been performed in the rendering setup step 638 and periodically updated.

Further details of the rendering step 646 are now described with reference to the flowchart of FIGS. 16 and 16A. In step 790 of FIG. 16, the processing unit 104 accesses the model of the environment. In step 792, the processing unit 104 determines the point of view of the user with respect to the model of the environment. That is, the system determines what portion of the environment or space the user is look at. In one embodiment, step 792 is a collaborative effort using hub computing device 12, processing unit 4 and head mounted display device 2 as described above.

In one embodiment, the processing unit 104 will attempt to add multiple virtual objects into a scene. In other embodiments, the unit 104 may only attempt to insert one virtual object into the scene. For a virtual object, the system has a target of where to insert the virtual object. In one embodiment, the target could be a real world object, such that the virtual object will be tagged to and augment the view of the real object. In other embodiments, the target for the virtual object can be in relation to a real world object.

In step 794, the system renders the previously created three dimensional model of the environment from the point of view of the user of head mounted display device 2 in a z-buffer, without rendering any color information into the corresponding color buffer. This effectively leaves the rendered image of the environment to be all black, but does store the z (depth) data for the objects in the environment. Step 794 results in a depth value being stored for each pixel (or for a subset of pixels). In step 798, virtual content (e.g., virtual images corresponding to virtual objects) is rendered into the same z-buffer and the color information for the virtual content is written into the corresponding color buffer. This effectively allows the virtual images to be drawn on the headset microdisplay 120 taking into account real world objects or other virtual objects occluding all or part of a virtual object.

In step 800, virtual objects being drawn over or tagged to moving objects may be blurred just enough to give the appearance of motion. In step 802, the system identifies the pixels of microdisplay 120 that display virtual images. In step 806, alpha values are determined for the pixels of microdisplay 120. In traditional chroma key systems, the alpha value is used to identify how opaque an image is, on a pixel-by-pixel basis. In some applications, the alpha value can be binary (e.g., on or off). In other applications, the alpha value can be a number with a range. In one example, each pixel identified in step 802 will have a first alpha value and all other pixels will have a second alpha value.

In step 810, the pixels for the opacity filter are determined based on the alpha values. In one example, the opacity filter has the same resolution as microdisplay 120 and, therefore, the opacity filter can be controlled using the alpha values. In another embodiment, the opacity filter has a different resolution than microdisplay 120 and, therefore, the data used to darken or not darken the opacity filter will be derived from the alpha value by using any of various mathematical algorithms for converting between resolutions. Other means for deriving the control data for the opacity filter based on the alpha values (or other data) can also be used.

In step 812, the images in the z-buffer and color buffer, as well as the alpha values and the control data for the opacity filter, are adjusted to account for light sources (virtual or real) and shadows (virtual or real). More details of step 812 are provided below with respect to FIG. 16A. The process of FIG. 16 allows for automatically displaying a virtual image over a stationary or moving object (or in relation to a stationary or moving object) on a display that allows actual direct viewing of at least a portion of the space through the display.

Figure 16:
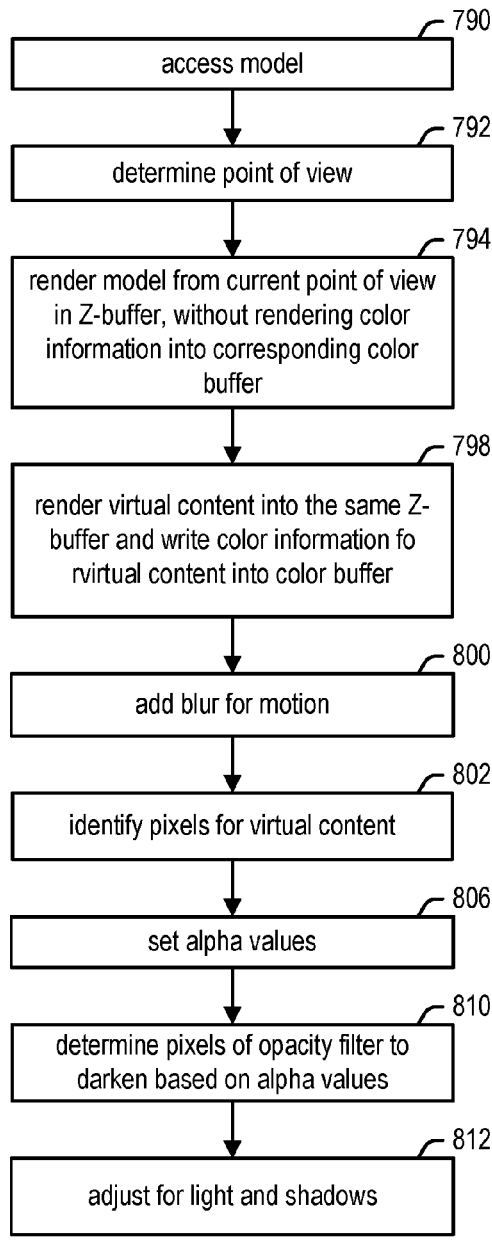
Figure 16A:
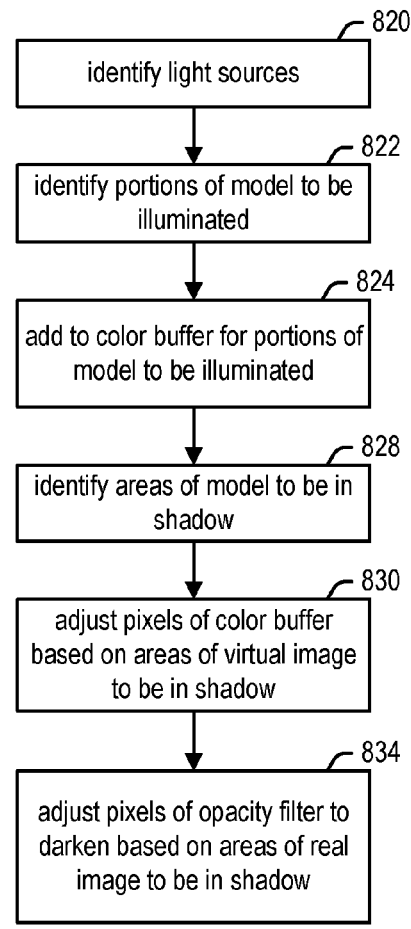

FIG. 16A is a flowchart describing one embodiment of a process for accounting for light sources and shadows, which is an example implementation of step 812 of FIG. 16. In step 820, processing unit 4 identifies one or more light sources that need to be accounted for. For example, a real light source may need to be accounted for when drawing a virtual image. If the system is adding a virtual light source to the user's view, then the effect of that virtual light source can be accounted for in the head mounted display device 2 as well. In step 822, the portions of the model (including virtual objects) that are illuminated by the light source are identified. In step 824, an image depicting the illumination is added to the color buffer described above.

In step 828, processing unit 4 identifies one or more areas of shadow that need to be added by the head mounted display device 2. For example, if a virtual object is added to an area in a shadow, then the shadow needs to be accounted for when drawing the virtual object by adjusting the color buffer in step 830. If a virtual shadow is to be added where there is no virtual object, then the pixels of opacity filter 114 that correspond to the location of the virtual shadow are darkened in step 834.

In step 650, the processing unit checks whether it is time to send a rendered image to the head mounted display device 2, or whether there is still time for further refinement of the extrapolated prediction using more recent position feedback data from the hub 12 and/or head mounted display device 2. In a system using a 60 Hertz frame refresh rate, a single frame is about 16 ms. In embodiments, the frame may be sent to the head mounted display device 2 for display about half way through the frame. Thus, where X=8 ms (or less), the processing unit would send the rendered image to the head mounted display device 2 in step 650.

In particular, the composite image based on the z-buffer and color buffer (described above with respect to FIGS. 16 and 16A) is sent to microdisplay 120. That is, the virtual image is sent to microdisplay 120 to be displayed at the appropriate pixels, accounting for perspective and occlusions. At this time, the control data for the opacity filter is also transmitted from processing unit 4 to head mounted display device 2 to control opacity filter 114. The head mounted display would then display the image to the user in step 658. If the processing unit has correctly predicted the FOV and object positions, then any virtual objects which are supposed to appear where the user is looking at the close of the frame are displayed at their proper positions and with the proper occlusion.

On the other hand, where it is not yet time to send a frame of image data to be displayed in step 650, the processing unit may loop back for more updated data to further refine the predictions of the final FOV and the final positions of objects in the FOV. In particular, if there is still time in step 650, the processing unit 4 may return to step 608 to get more recent sensor data from the hub 12, and may return to step 656 to get more recent sensor data from the head mounted display device 2. Each successive time through the loop of steps 632 through 650, the extrapolation performed uses a smaller time period into the future. As the time period over which data is extrapolated becomes smaller (X decreases), the extrapolations of the final FOV and object positions at t+X ms become more predictable and accurate.

The processing steps 630 through 652 are described above by way of example only. It is understood that one or more of these steps may be omitted in further embodiments, the steps may be performed in differing order, or additional steps may be added.

Moreover, the flowchart of the processor unit steps in FIG. 9 shows all data from the hub 12 and head mounted display device 2 being cyclically provided to the processing unit 4 at the single step 632. However, it is understood that the processing unit 4 may receive data updates from the different sensors of the hub 12 and head mounted display device 2 asynchronously at different times. The head mounted display device 2 provides image data from cameras 112 and inertial data from IMU 132. Sampling of data from these sensors may occur at different rates and may be sent to the processing unit 4 at different times. Similarly, processed data from the hub 12 may be sent to the processing unit 4 at a time and with a periodicity that is different than data from both the cameras 112 and IMU 132. In general, the processing unit 4 may asynchronously receive updated data multiple times from the hub 12 and head mounted display device 2 during a frame. As the processing unit cycles through its steps, it uses the most recent data it has received when extrapolating the final predictions of FOV and object positions.

Figure 17:
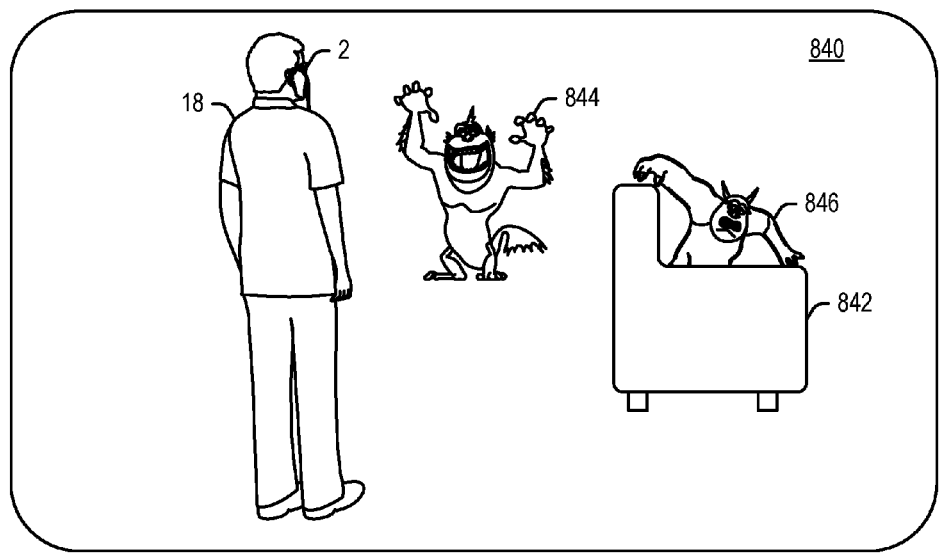
FIG. 17 is a exemplary field of view showing user-independent virtual objects displayed in a mixed reality environment.

FIG. 17 is an illustration of a FOV 840 seen through a head mounted display device 2 of a user (not shown). The FOV 840 includes an actual direct view of real world objects including another user 18 and a chair 842. The FOV 840 further includes a display of virtual images 844 and 846. The virtual image 846 is shown climbing the chair 842. As the chair is in front of the lower half of the virtual image 846, the chair occludes the lower half of virtual image 846 as described above. User 18 is shown also wearing a head mounted display device 2. Thus, the user 18 would also see the same virtual images 844 and 846, but adjusted for parallax and the occlusions from his line of sight. For example, as the user 18 is closer to the virtual images 844, 842, they may appear bigger in his FOV. The virtual image 108 may also have a different occlusion.

Figure 18:
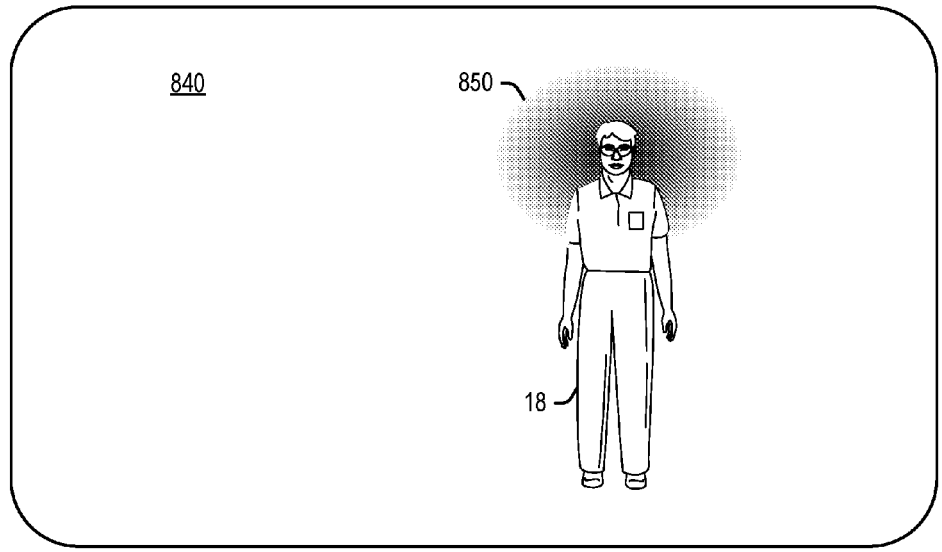
FIG. 18 is a exemplary field of view showing a user-dependent virtual object displayed in a mixed reality environment.

FIG. 18 is a further illustration of FOV 840 seen through a head mounted display device 2 of a user (not shown). The FOV 840 includes an actual direct view of another user 18, and a virtual image 810 tagged to the user 18, partially outlining the user. As the user moves (left, right, turns, bends, etc.), the virtual image would continue to partially outline the user 18.

Figure 19:
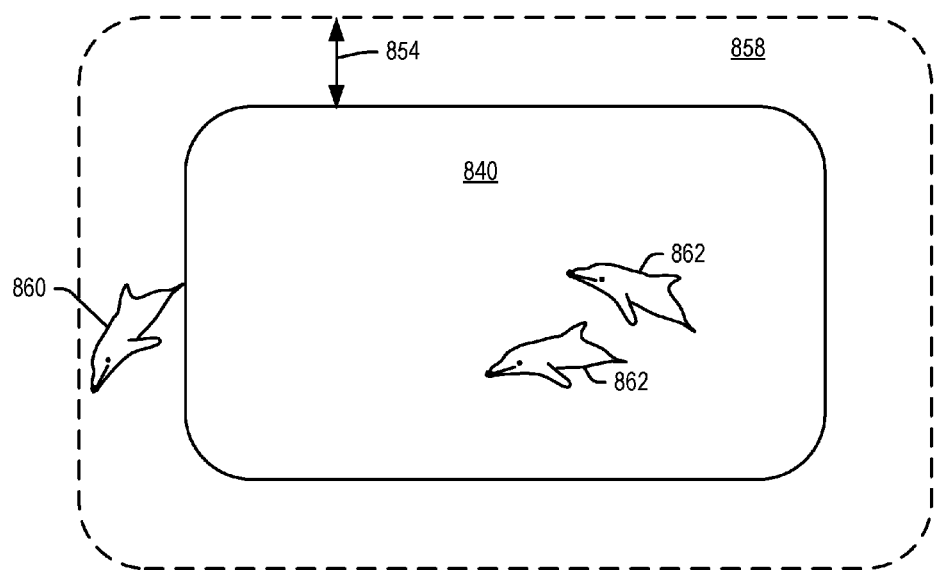
FIGS. 19 and 20 illustrate a pair of exemplary expanded fields of view according to a further embodiment of the present technology.
Figure 20:
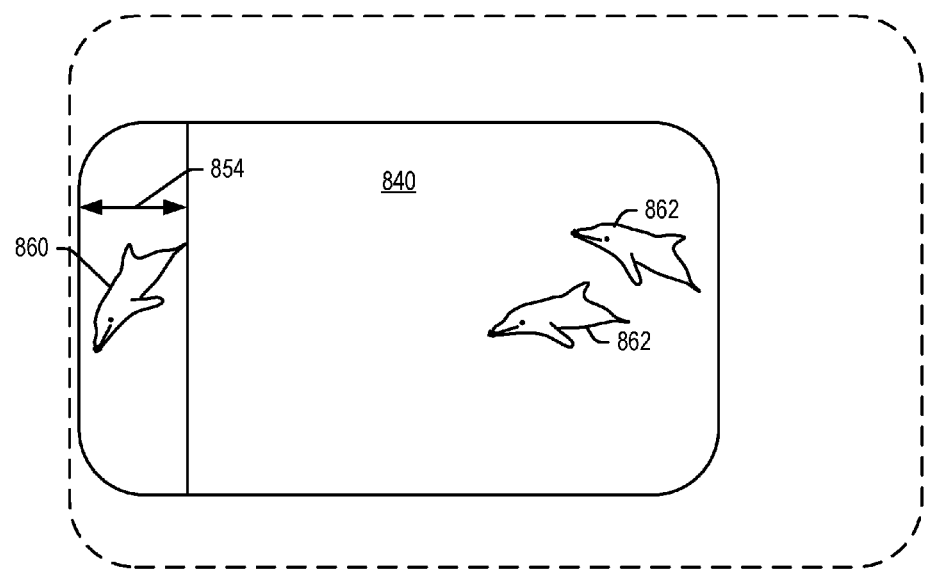

FIGS. 19 and 20 and illustrate a further embodiment of the present system. In the above-described embodiment, for example in step 632 of FIG. 9, the processing unit 4 for a given user extrapolated the position of the final FOV at a time of display t+X ms. Then, any virtual objects in the extrapolated FOV were rendered in step 646. In the embodiment of FIG. 19, instead of merely extrapolating the final predicted FOV, the processing unit (or hub 12) adds a border 854 surrounding the FOV 840 to provide an expanded FOV 858. The size of the border 854 may vary in embodiments, but may be large enough to encompass a possible new FOV resulting from the user turning his head in any direction in a next subsequent time period of predetermined length (e.g., one-half of a frame).

In the embodiment of FIG. 19, the positions of any virtual objects within the FOV are extrapolated, as in step 640 described above. However, in this embodiment, all virtual objects within the expanded FOV 858 are considered in the extrapolation. Thus, in FIG. 19, the processing unit 4 would extrapolate the position of virtual object 860 in the expanded FOV 858 in addition to the virtual objects 862 in predicted FOV 840.

In the next subsequent time period, if a user turns his head, for example to the left, the FOV 840 will shift to the left (resulting in the positions of all virtual objects moving to the right with respect to the new FOV 840). This scenario is illustrated in FIG. 20. In this embodiment, instead of having to re-render all objects in the new FOV 840, all objects in the previous FOV 840 shown in FIG. 19 may be pixel-shifted by the determined distance change in the new FOV 840 position. Thus, the virtual objects 860 may be displayed in their proper position, shifted to the right, without having to re-render them. The only rendering needed is for any area of the expanded FOV 858 that is newly included within the new FOV 840. Thus, the processing unit 104 would render the virtual image 862. Its position would already be known as it was included in the expanded FOV 858 from the previous time period.

Using the embodiment described in FIGS. 19 and 20, an updated display of the user FOV may be generated quickly by having to render only a slice of the image and re-using the rest of the image from the previous time period. Thus, updated image data may be sent to the head mounted display device 2 to be displayed during a frame, for example midway through the frame, effectively doubling the frame refresh rate. The image data may be re-sampled and re-rendered once a frame as described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for presenting a mixed reality experience to a user, the system comprising:
   a display device including a display unit for displaying a virtual image to the user of the display device;
   a set of one or more sensors for sensing at least one of a position of the display device in real world space and positions of real world objects in a field of view of the display device; and
   one or more processing units in communication with the display device, the one or more processing units receiving the data relating to positions of the real world objects in the field of view at a present time within a video frame, and the one or more processing units extrapolating a position of a virtual three-dimensional object at a future time in the same video frame, the virtual three-dimensional object positioned at least partially behind a position of a real world object, the position extrapolated to the future time to display a proper occlusion of the virtual object by the real world object at the future time when the virtual object is displayed by the display unit.

2. The system of claim 1, the display device and the one or more processing units collaboratively determining a three-dimensional map of the environment in real time.

3. The system of claim 1, the one or more processing units providing computer models of the one or more users in the environment and the positions of display devices.

4. The system of claim 3, the model of the user and the position of the display device enabling determination by the one or more processing units of the field of view of the display device.

5. The system of claim 4, the set of sensors including an imaging camera and inertial sensors for providing the positions of the display device associated with the processing device.

6. The system of claim 1, the one or more processing units further determining a degree by which the extrapolated position of the virtual three-dimensional object is occluded by the real world object in a three-dimensional map of the environment from a perspective of the display device associated with the processing unit.

7. The system of claim 1, wherein the one or more processing units comprise a processing unit integrated as part of the display device.

8. The system of claim 1, wherein the one or more processing units comprise a processing unit coupled to the display device via a cable.

9. The system of claim 1, wherein the one or more processing units comprise a processing unit connected to the display device via a network connection.

10. A system for presenting a mixed reality experience to a user, the system comprising:
    a display device including a display unit for displaying a virtual image to the user of the display device;
    a set of one or more sensors for sensing at least one of a position of the display device in real world space and positions of real world objects in a field of view of the display device; and
    one or more processing units in communication with the display device, the one or more processing units receiving the data relating to the position of the display device at a present time within a video frame, the one or more processing units rendering virtual objects in a field of view of the display device at the present time and the one or more processing units extrapolating possible fields of view bordering the field of view at the present time due to head movement of the user at a future time in the same video frame, the one or more processing units additionally rendering virtual objects in the possible fields of view bordering the field of view at the present time.

11. The system of claim 10, the display device displaying the virtual objects in the field of view at the future time, including at least portions of one or more virtual objects in the possible fields of view bordering the field of view.

12. The system of claim 10, the display device displaying the virtual objects in the field of view at the future time by pixel-shifting virtual objects to account for the head movement between the present time and the future time.

13. The system of claim 10, wherein the one or more processing units comprise a processing unit integrated as part of the display device.

14. The system of claim 10, wherein the one or more processing units comprise a processing unit coupled to the display device via a cable.

15. The system of claim 10, wherein the one or more processing units comprise a processing unit connected to the display device via a network connection.

16. A method of presenting a mixed reality experience to one or more users, the system comprising:
    (a) determining state information for at least a first period of time from a first video frame, and a second period of time from a second video frame subsequent to the first video frame, the state information relating to a field of view of a user of the one or more users of an environment, the environment including a mixed reality of one or more real world objects and one or more virtual objects;
(b) extrapolating the state information relating to the field of view of the user of the environment for a third period of time in the second video frame, the third period of time being a time in the second video frame, after the second period of time, when the one or more virtual objects of the mixed reality are to be displayed to the user; and
(c) displaying at least one virtual object of the one or more virtual objects to the user at the third period of time based on the state information relating to the field of view of the user extrapolated in said step (b), the at least one virtual object being at least partially outside of a field of view at the second time, the extrapolated state information at the third period of time enabling a seamless display of the at least one virtual object without having to re-render the at least one virtual object at the third period of time.

17. The method of claim 16, said step (b) of extrapolating the state information relating to the field of view for the third period of time comprising the step of extrapolating state information relating to a perspective at which the field of view views the environment.

18. The method of claim 16, said step (b) of extrapolating the state information relating to the field of view for the third period of time comprising the step of extrapolating state information relating to positions of virtual objects within the field of view of the environment and within a border around the field of view at the second period of time.

19. The method of claim 16, further comprising the step of collaboratively determining a map of the environment of the mixed reality, the map of the environment include three-dimensional position information relating to the one or more users, real world objects in the environment, and the one or more virtual objects in the environment.

20. The method of claim 19, said step of collaboratively determining a map of the environment comprising the step of determining the map of the environment by a processing unit in communication with a head mounted display device on which the one or more virtual objects are displayed.

* * * * *